US010455634B2

(12) United States Patent
Asakura et al.

(10) Patent No.: US 10,455,634 B2
(45) Date of Patent: Oct. 22, 2019

(54) COMMUNICATION DEVICE AND A NON-TRANSITORY COMPUTER-READABLE RECORDING MEDIUM

(71) Applicant: Brother Kogyo Kabushiki Kaisha, Nagoya-shi, Aichi-ken (JP)

(72) Inventors: Hirotaka Asakura, Nagoya (JP); Hiroshi Shibata, Obu (JP)

(73) Assignee: Brother Kogyo Kabushiki Kaisha, Nagoya-shi, Aichi-ken (JP)

( * ) Notice: Subject to any disclaimer, the term of this patent is extended or adjusted under 35 U.S.C. 154(b) by 0 days.

(21) Appl. No.: 16/027,607

(22) Filed: Jul. 5, 2018

(65) Prior Publication Data

US 2019/0014609 A1 Jan. 10, 2019

(30) Foreign Application Priority Data

Jul. 5, 2017 (JP) ................................ 2017-132199

(51) Int. Cl.
*H04W 76/14* (2018.01)
*G06F 3/12* (2006.01)
(Continued)

(52) U.S. Cl.
CPC .......... *H04W 76/14* (2018.02); *G06F 3/1204* (2013.01); *G06F 3/1231* (2013.01);
(Continued)

(58) Field of Classification Search
CPC .... G06F 3/1292; G06F 3/1236; G06F 3/1203; G06F 3/1204; G06F 3/1211;
(Continued)

(56) References Cited

U.S. PATENT DOCUMENTS 9,787,363 B2 * 10/2017 Suzuki ..................... H04B 5/00
2013/0258390 A1 * 10/2013 Suzuki .............. H04N 1/00912 358/1.14

(Continued)

OTHER PUBLICATIONS

Wi-Fi Peer to Peer (P2P) Technical; Version 1.5; 2014 Wi-Fi Alliance; pp. 1-83.

*Primary Examiner* — Negussie Worku
(74) *Attorney, Agent, or Firm* — Banner & Witcoff, Ltd.

(57) ABSTRACT

A communication device is described as including: a first wireless interface configured to communicate over a first distance; a second wireless interface configured to communicate over a second distance, the second distance being greater than the first distance; a display; a processor; and a memory storing computer-readable instructions therein, the computer-readable instructions, when executed by the processor, causing the communication device to: receive, via the second wireless interface, a connection request from a first external device; wait for user confirmation of second wireless interface connection between the first external device and communication device; while waiting, establish, via the first wireless interface, a connection with a second external device; where no user confirmation has been received and the connection with the second external device has been established, terminate the waiting; and establish, via the second wireless interface, a connection with the second external device.

23 Claims, 22 Drawing Sheets

(51) Int. Cl.
*H04M 1/725* (2006.01)
*H04W 92/18* (2009.01)

(52) U.S. Cl.
CPC ........ *G06F 3/1236* (2013.01); *H04M 1/7253* (2013.01); *G06F 3/1292* (2013.01); *H04W 92/18* (2013.01)

(58) Field of Classification Search
CPC ... H04N 2201/0055; H04N 2201/0094; H04N 1/00244; H04N 1/00307; H04N 2201/0015; H04N 2201/006; H04N 1/00204; H04N 1/00217; H04N 1/00225; H04N 1/00228; H04N 1/00233; H04N 1/00241; H04N 1/00278; H04N 1/00281; H04N 1/00347; H04N 1/00413; H04N 1/00474; H04N 1/00973; H04N 1/32773; H04N 1/33323; H04N 1/33353; H04N 2201/0013; H04N 2201/0036; H04N 2201/0039; H04N 2201/0041; H04N 2201/0043; H04N 2201/0044; H04N 2201/0075; H04N 2201/0081; H04N 2201/0096; G06K 15/4045; H04W 40/24; H04W 4/80; H04W 76/00; H04W 84/12
USPC ........................................................ 358/1.15
See application file for complete search history.

(56) References Cited

U.S. PATENT DOCUMENTS

| | | | | | |
|---|---|---|---|---|---|
| 2014/0104638 | A1* | 4/2014 | Kato | H04N 1/44 358/1.14 |
| 2014/0240775 | A1* | 8/2014 | Suzuki | G06F 3/1292 358/1.15 |
| 2015/0327172 | A1* | 11/2015 | Kusakabe | H04W 52/0229 370/331 |
| 2015/0350905 | A1* | 12/2015 | Suzuki | H04L 63/08 726/7 |
| 2017/0041736 | A1* | 2/2017 | Asakura | H04L 67/104 |
| 2017/0127379 | A1* | 5/2017 | Mayuzumi | G01S 3/801 |
| 2018/0096123 | A1* | 4/2018 | Shibata | G06F 21/608 |
| 2018/0225073 | A1* | 8/2018 | Nonoyama | H04N 1/00342 |
| 2018/0239572 | A1* | 8/2018 | Suzuki | G06F 3/1292 |
| 2018/0288820 | A1* | 10/2018 | Shibata | H04W 76/14 |
| 2019/0014609 | A1* | 1/2019 | Asakura | H04W 76/14 |

* cited by examiner (FIRST COMPARATIVE EXAMPLE)

(FIRST EMBODIMENT)
(CASE F)

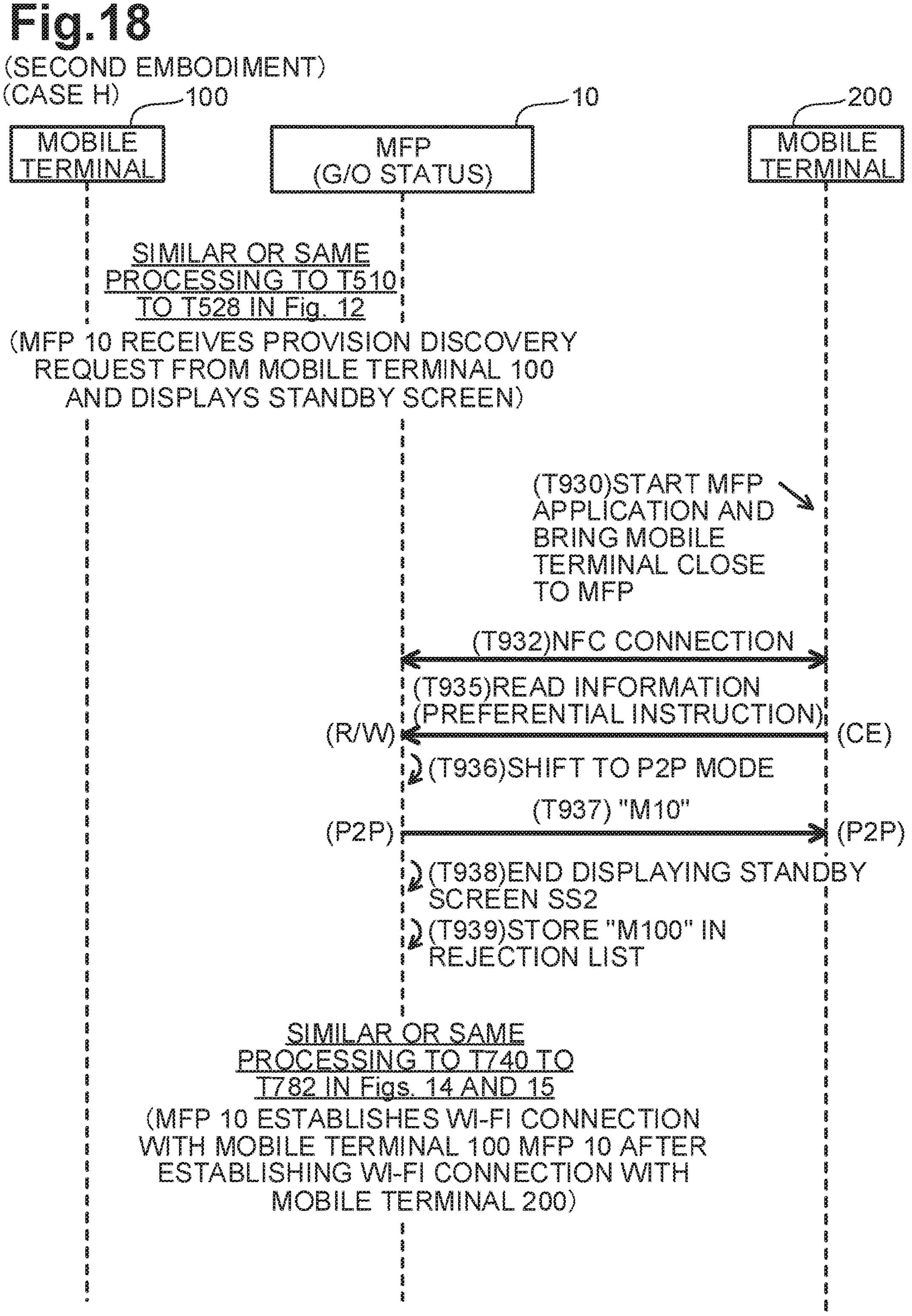

Fig. 18
(SECOND EMBODIMENT)
(CASE H)

```
          100                    10                     200
    ┌──────────┐          ┌──────────┐            ┌──────────┐
    │  MOBILE  │          │    MFP   │            │  MOBILE  │
    │ TERMINAL │          │(G/O STATUS)│          │ TERMINAL │
    └──────────┘          └──────────┘            └──────────┘
```

SIMILAR OR SAME
PROCESSING TO T510
TO T528 IN Fig. 12
(MFP 10 RECEIVES PROVISION DISCOVERY
REQUEST FROM MOBILE TERMINAL 100
AND DISPLAYS STANDBY SCREEN)

(T930) START MFP
APPLICATION AND
BRING MOBILE
TERMINAL CLOSE
TO MFP (T932) NFC CONNECTION (T935) READ INFORMATION
(PREFERENTIAL INSTRUCTION)
(R/W) ← (CE)

(T936) SHIFT TO P2P MODE (P2P) (T937) "M10" → (P2P)

(T938) END DISPLAYING STANDBY
SCREEN SS2

(T939) STORE "M100" IN
REJECTION LIST

SIMILAR OR SAME
PROCESSING TO T740 TO
T782 IN Figs. 14 AND 15
(MFP 10 ESTABLISHES WI-FI CONNECTION
WITH MOBILE TERMINAL 100 MFP 10 AFTER
ESTABLISHING WI-FI CONNECTION WITH
MOBILE TERMINAL 200)

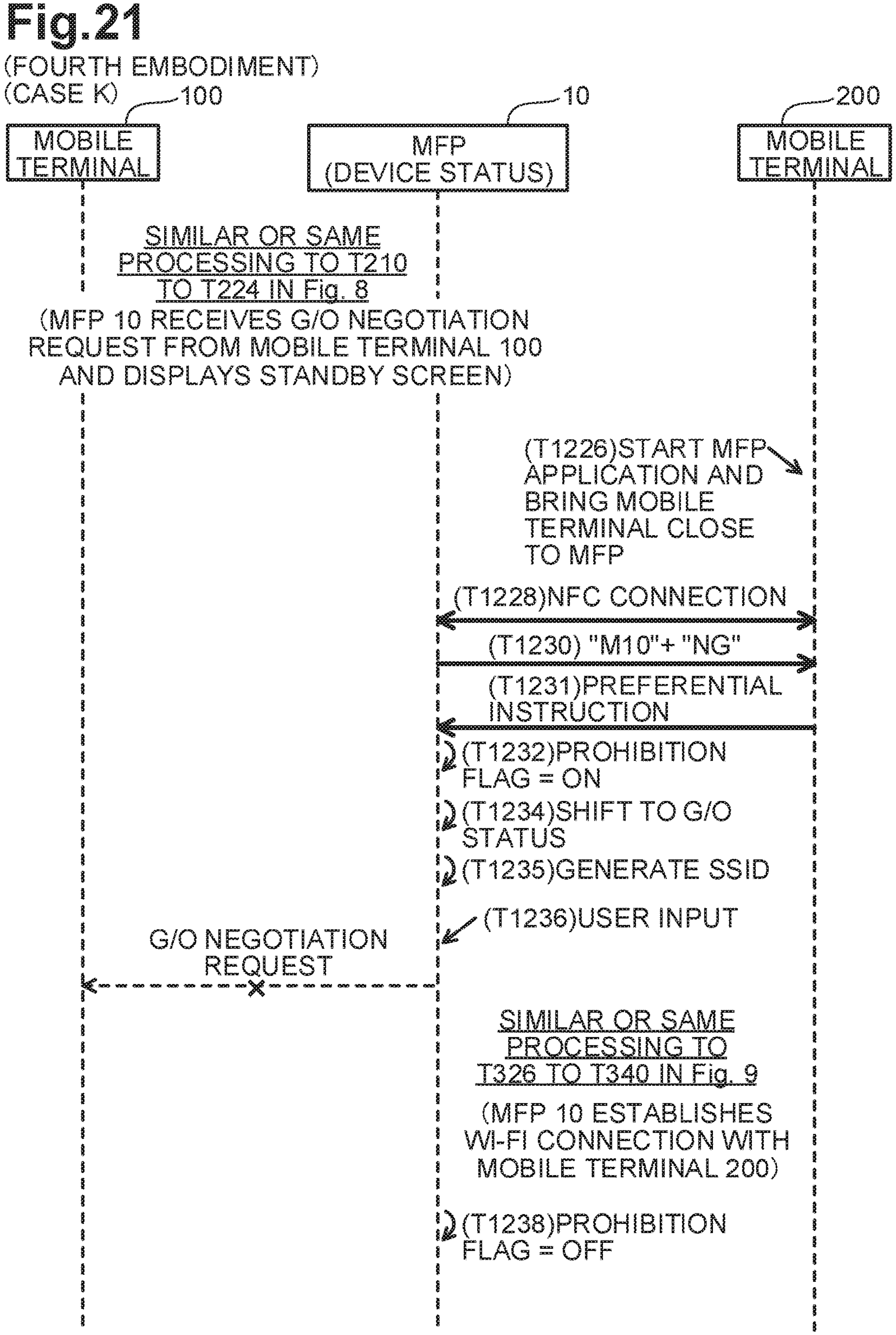

Fig.21
(FOURTH EMBODIMENT)
(CASE K)

```
   MOBILE              MFP                    MOBILE
   TERMINAL (100)      (DEVICE STATUS) (10)   TERMINAL (200)
```

SIMILAR OR SAME PROCESSING TO T210 TO T224 IN Fig. 8
(MFP 10 RECEIVES G/O NEGOTIATION REQUEST FROM MOBILE TERMINAL 100 AND DISPLAYS STANDBY SCREEN)

(T1226) START MFP APPLICATION AND BRING MOBILE TERMINAL CLOSE TO MFP (T1228) NFC CONNECTION (T1230) "M10" + "NG"

(T1231) PREFERENTIAL INSTRUCTION (T1232) PROHIBITION FLAG = ON (T1234) SHIFT TO G/O STATUS (T1235) GENERATE SSID (T1236) USER INPUT

G/O NEGOTIATION REQUEST ✗

SIMILAR OR SAME PROCESSING TO T326 TO T340 IN Fig. 9
(MFP 10 ESTABLISHES WI-FI CONNECTION WITH MOBILE TERMINAL 200)

(T1238) PROHIBITION FLAG = OFF

COMMUNICATION DEVICE AND A NON-TRANSITORY COMPUTER-READABLE RECORDING MEDIUM

CROSS-REFERENCE TO RELATED APPLICATION

This application claims priority from Japanese Patent Application No. 2017-132199 filed on Jul. 5, 2017, the content of which is incorporated herein by reference in its entirety.

TECHNICAL FIELD

Aspects of the disclosure relates to a communication device capable of establishing a wireless connection with an external device.

BACKGROUND

For establishing between two target devices a wireless connection that complies with a Wi-Fi® (Wi-Fi® is a registered certification mark owned by the Wi-Fi Alliance of Austin, Tex.) protocol, for example, a Wi-Fi Protected Setup™ (Wi-Fi Protected Setup™ is a trademark owned by the Wi-Fi Alliance of Austin, Tex.) ("WPS") may be used. For example, in response to receipt of a connection request from a first target device, a second target device displays a standby screen for waiting for input of a user operation (e.g., a push button operation). In response to acceptance of the user operation while the standby screen is displayed on the second target device, the first and second target devices execute communication using the WPS, i.e., the first and second target devices exchange therebetween wireless setup information for establishing a wireless connection, thereby establishing therebetween a wireless connection that complies with the Wi-Fi® protocol. Thus, the user may be allowed to establish a wireless connection between two devices by such a simple operation, e.g., a push button operation.

In another example, for establishing between two target devices a wireless connection that complies with the Wi-Fi® protocol, in response to execution of short range wireless communication such as Near Field Communication ("NFC") between two target devices, these devices execute communication using the WPS to establish therebetween a wireless connection that complies with the Wi-Fi® protocol. Such techniques for establishing a wireless connection that complies with the Wi-Fi® protocol are specified in the "Wi-Fi Peer-to-Peer (P2P) Technical Specification Version 1.5" created by the Wi-Fi Alliance in 2014.

SUMMARY

Nevertheless, a conventional approach has not considered that a communication device may receive at close timing connection requests from a first external device and a second external device. Accordingly, some embodiments of the disclosure provide for a technique for enabling the communication device to establish a wireless connection with an appropriate one of external devices where the communication device receives a connection request from one of the external devices despite shortly later receiving a short-range communication with another of the external devices.

One or more aspects of the disclosure relate to a communication device that selectively connects with one of a plurality of external devices based on the distance in which the plurality of external devices attempted to establish a communication with the communication device.

For instance, the communication device may perform operations including: receive, via the second wireless interface, a connection request from a first external device; wait for user confirmation of second wireless interface connection between the first external device and communication device; while waiting, establish, via the first wireless interface, a connection with a second external device; and where no user confirmation has been received and the connection with the second external device has been established: terminate the waiting; and establish, via the second wireless interface, a connection with the second external device.

In one or more aspects, a communication device may have two wireless interfaces. In response to a connection request received via the second wireless interface from a first external device, the communication device may wait for user confirming the connection. A wireless connection via the first wireless interface may be subsequently established between the communication device and the second external device When such a situation occurs, a distance between the communication device and the second external device may be shorter than a distance between the communication device and the first external device. This is because the maximum communicable range in wireless communication via the first wireless interface is shorter than the maximum communicable range in wireless communication via the second interface. In such a situation, the communication device may end displaying the standby screen. This configuration may therefore avoid or reduce an occurrence of an unintended event, such as an operation performed on the operation interface by the first user. Thus, the communication device may be allowed to establish the second wireless connection with the second external device that may be closer to the communication device than the first external device.

For instance, the communication device may perform operations including: receive, via the second wireless interface, a connection request from a first external device; wait for a user confirmation of second wireless interface connection between the first external device and communication device; while waiting, establish, via first wireless interface, a connection with a second external device; and while waiting, execute establishing process, wherein the establishing process is a process for establishing, via the second wireless interface, a connection with the second external device, and wherein while the establishing process is executing, the communication device does not respond to subsequent receipt of the user confirmation for establishing.

In one or more aspects, a communication device may have two wireless interfaces. In response to a connection request received via the second wireless interface from a first external device, the communication device may wait for user confirming the connection. A wireless connection via the first wireless interface may be subsequently established between the communication device and the second external device When such a situation occurs, a distance between the communication device and the second external device may be shorter than a distance between the communication device and the first external device. This is because the maximum communicable range in wireless communication via the first wireless interface is shorter than the maximum communicable range in wireless communication via the second interface. If the first user performs an operation on the operation interface in the above situation, the communication device does not transmit the predetermined signal for starting communication for establishing a wireless connection via the second wireless interface. Therefore, the communication device does not establish a wireless connection with the first external device via the second wireless interface. Thus, the communication device may be allowed to establish the second wireless connection with the second external device that may be closer to the communication device than the first external device.

Control methods and computer programs for implementing the above-described communication device, and computer-readable storage media storing the computer programs may have novelty and utility. Communication systems including the above-described communication device and the external device (e.g., the first external device and/or the second external device) may also have novelty and utility.

BRIEF DESCRIPTION OF THE DRAWINGS

Aspects of the disclosure are illustrated by way of example and not by limitation in the accompanying figures in which like reference characters indicate similar elements.

FIG. 18 is a sequence diagram representing interactions between the multifunction peripheral and the mobile terminals in case H in which an NFC connection becomes established when the multifunction peripheral is in the G/O status and the standby screen is being displayed in the second embodiment according to one or more aspects of the disclosure.

FIG. 21 is a sequence diagram representing interactions between the multifunction peripheral and the mobile terminals in case K in which an NFC connection becomes established when the multifunction peripheral is in the device status and the standby screen is being displayed in a fourth embodiment according to one or more aspects of the disclosure.

DETAILED DESCRIPTION

First Embodiment

Figure 1:
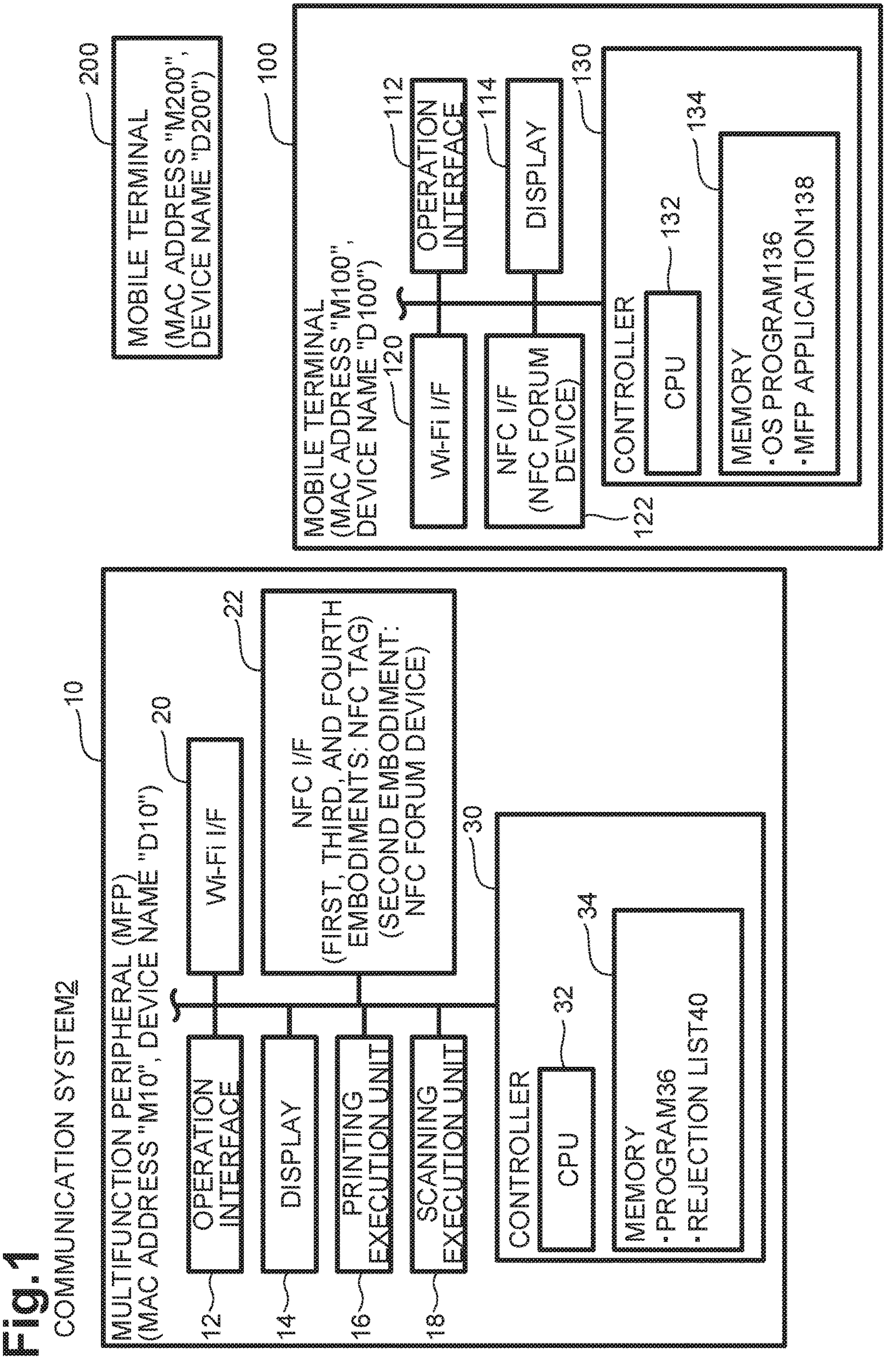
FIG. 1 represents a configuration of a communication system in a first embodiment according to one or more aspects of the disclosure.

Configuration of Communication System 2; FIG. 1

As illustrated in FIG. 1, a communication system 2 includes a multifunction peripheral ("MFP") 10, a mobile terminal 100, and a mobile terminal 200. Each of the multifunction peripheral 10, the mobile terminal 100, and the mobile terminal 200 is configured to execute wireless communication that complies with a Wi-Fi® (Wi-Fi® is a registered certification mark owned by the Wi-Fi Alliance of Austin, Tex.) protocol (hereinafter, also referred to as "Wi-Fi® communication"). Each of the multifunction peripheral 10, the mobile terminal 100, and the mobile terminal 200 is further configured to execute wireless communication that complies with a Near Field Communication ("NFC") protocol (hereinafter, also referred to as "NFC communication").

Configuration of MFP 10

The MFP 10 may be a peripheral device capable of performing multiple functions including, for example, a printing function and a scanning function. The MFP 10 is assigned with a MAC address "M10" and a device name "D10". The MFP 10 includes an operation interface 12, a display 14, a printing execution unit 16, a scanning execution unit 18, a Wi-Fi® interface ("I/F") 20, an NFC I/F 22, and a controller 30.

The operation interface 12 includes a plurality of keys or buttons. The operation interface 12 may enable a user to input various instructions to the MFP 10 by operating the operation interface 12. The display 14 is configured to display various information thereon. The display 14 includes a touch screen and also serves as an operation interface. The printing execution unit 16 may be a printing mechanism using an inkjet printing method or a laser printing method. The scanning execution unit 18 may be a scanning mechanism including, for example, a charge-coupled device ("CCD") or a complementary metal oxide semiconductor ("CMOS").

The Wi-Fi® I/F 20 is a wireless interface for enabling Wi-Fi® communication that complies with the Wi-Fi® protocol. In the Wi-Fi® protocol, wireless communication is executed in compliance with, for example, the standard IEEE (The Institute of Electrical and Electronics Engineers, Inc.) 802.11 and its family standards (e.g., 802.11a, 802.11b, 802.11g, and 802.11n). The Wi-Fi® I/F 20 supports a Wi-Fi Direct™ (Wi-Fi Direct™ is a certification mark owned by the Wi-Fi Alliance of Austin, Tex.) ("WFD") protocol developed by the Wi-Fi Alliance particularly, and enables wireless communication in compliance with the WFD protocol. The WFD protocol is wireless communication specified in "Wi-Fi Peer-to-Peer (P2P) Technical Specification Version 1.5" created by the Wi-Fi Alliance.

The MFP 10 is configured to operate in one of a Group Owner ("G/O") status, a Client ("CL") status, and a device status ("Device Status") of the WFD protocol. When the MFP 10 is in the G/O status, the MFP 10 may configure a WFD network ("WFDNW") in which the MFP 10 operates as a master station (i.e., a G/O) and an external device operates as a slave station. When the external device is in the G/O status, the MFP 10 operates in the CL status. The MFP 10 may participate as a slave station (i.e., a CL) in a WFDNW configured by the external device. When the MFP 10 is in the device status, the MFP 10 is not in the G/O status or in the CL status. That is, the MFP 10 has not established a connection with any external device.

The Wi-Fi® I/F 20 also supports a Wi-Fi Protected Setup™ (Wi-Fi Protected Setup™ is a trademark owned by the Wi-Fi Alliance of Austin, Tex.) ("WPS") developed by the Wi-Fi Alliance. The WPS is called an automatic wireless setup or simple wireless setup. The WPS enables one target device and another target device to establish a wireless connection in compliance with the Wi-Fi® protocol (hereinafter, referred to as a "Wi-Fi® connection") therebetween readily without requiring any user entry of wireless setup information (e.g., a password, authentication method, and encryption method) for establishing the Wi-Fi® connection. The Wi-Fi® I/F 20 also supports a push-button configuration ("PBC") protocol of the WPS. The PBC protocol enables one target device and another target device to establish a Wi-Fi® connection therebetween in response to a user operation (e.g., a push button operation) on each of the devices for establishing a wireless connection.

The NFC I/F 22 is a wireless interface for enabling NFC communication that complies with the NFC protocol. The NFC protocol is a wireless communication protocol in compliance with the International standard, e.g., ISO/IEC 14443, ISO/IEC 15693, or ISO/IEC 18092. Interfaces for enabling NFC communication include, for example, an NFC Forum device and an NFC Forum tag. In the first embodiment, the NFC I/F 22 is an NFC Forum tag.

A communication method may be different between the Wi-Fi® I/F 20 and the NFC I/F 22. A communication speed in the Wi-Fi® communication via the Wi-Fi® I/F 20 is faster than a communication speed in the NFC protocol via the NFC I/F 22. More specifically, for example, the maximum communication speed in the Wi-Fi® communication may be between 11 and 600 Mbps and the maximum communication speed in the NFC communication may be between 100 and 424 Kbps. Further, the Wi-Fi® communication via the Wi-Fi® I/F 20 uses a different carrier frequency from the NFC communication via the NFC I/F 22. More specifically, for example, the Wi-Fi® communication may use a 2.4 GHz band or a 5.0 GHz band and the NFC communication may use a 13.56 MHz band. The maximum communicable range in the Wi-Fi® communication via the Wi-Fi® I/F 20 is greater than the maximum communicable range in the NFC communication via the NFC I/F 22. More specifically, for example, the maximum communicable range in the Wi-Fi® communication may be approximately 100 m and the maximum communicable range in the NFC communication may be approximately 10 cm.

The controller 30 includes a CPU 32 and a memory 34. The CPU 32 is configured to execute various processing in accordance with a program 36 (e.g., instructions) stored in the memory 34. The memory 34 may include a volatile memory and a nonvolatile memory. The memory 34 stores a rejection list 40. The rejection list 40 is used for registering a MAC address of a mobile terminal whose request for establishment of a Wi-Fi® connection with the MFP 10 is to be rejected.

Configuration of Mobile Terminal 100

The mobile terminal 100 may be, for example, a mobile phone, smartphone, personal digital assistant, laptop computer, tablet computer, mobile music player, or mobile movie player. The mobile terminal 100 is assigned with a MAC address "M1009" and a device name "D100". The mobile terminal 100 includes an operation interface 112, a display 114, a Wi-Fi® I/F 120, an NFC I/F 122, and a controller 130.

The operation interface 112 includes a plurality of keys or buttons. The operation interface 112 may enable a user to input various instructions to the terminal program 138 by operating the operation interface 112. The display 114 is configured to display various information thereon. The display 114 includes a touch screen and also serves as an operation interface. The Wi-Fi® I/F 120 has the same or similar configuration to the Wi-Fi® I/F 20 of the MFP 10. The NFC I/F 122 may be an NFC Forum device and is configured to operate in one of a Peer-to-Peer (P2P) mode, a Reader/Writer mode, and a Card Emulation ("CE") mode of the NFC protocol. In particular, in the first embodiment, the NFC I/F 122 is configured to, when the NFC I/F 122 operates in the Reader mode, to read (i.e., receive) necessary information from the NFC I/F 22 of the MFP 10. The NFC I/F 122 is further configured to, when the NFC I/F 122 operates in the Writer mode, to write (i.e., transmit) necessary information into the NFC I/F 22 of the MFP 10.

The controller 130 includes a CPU 132 and a memory 134. The CPU 132 is configured to execute various processing in accordance with a program 136 and/or an MFP application 138 stored in the memory 134. The program 136 may be an operating system ("OS") program configured to control basic operations of the mobile terminal 100. The memory 134 stores the MFP application 138. The MFP application 138 is provided by a vendor of the MFP 10. For example, the MFP application 138 may be served by a server on the Internet. The MFP application 138 may be downloaded from the server and installed on the mobile terminal 100. The MFP application 138 enables Wi-Fi® communication between the mobile terminal 100 and the MFP 10 and data communication of target data (e.g., print data or scan data) between the mobile terminal 100 and the MFP 10.

The mobile terminal 200 has the same or similar configuration to the mobile terminal 100 except that the mobile terminal 200 is assigned with a MAC address "M200" and a device name "D200".

Figure 2:
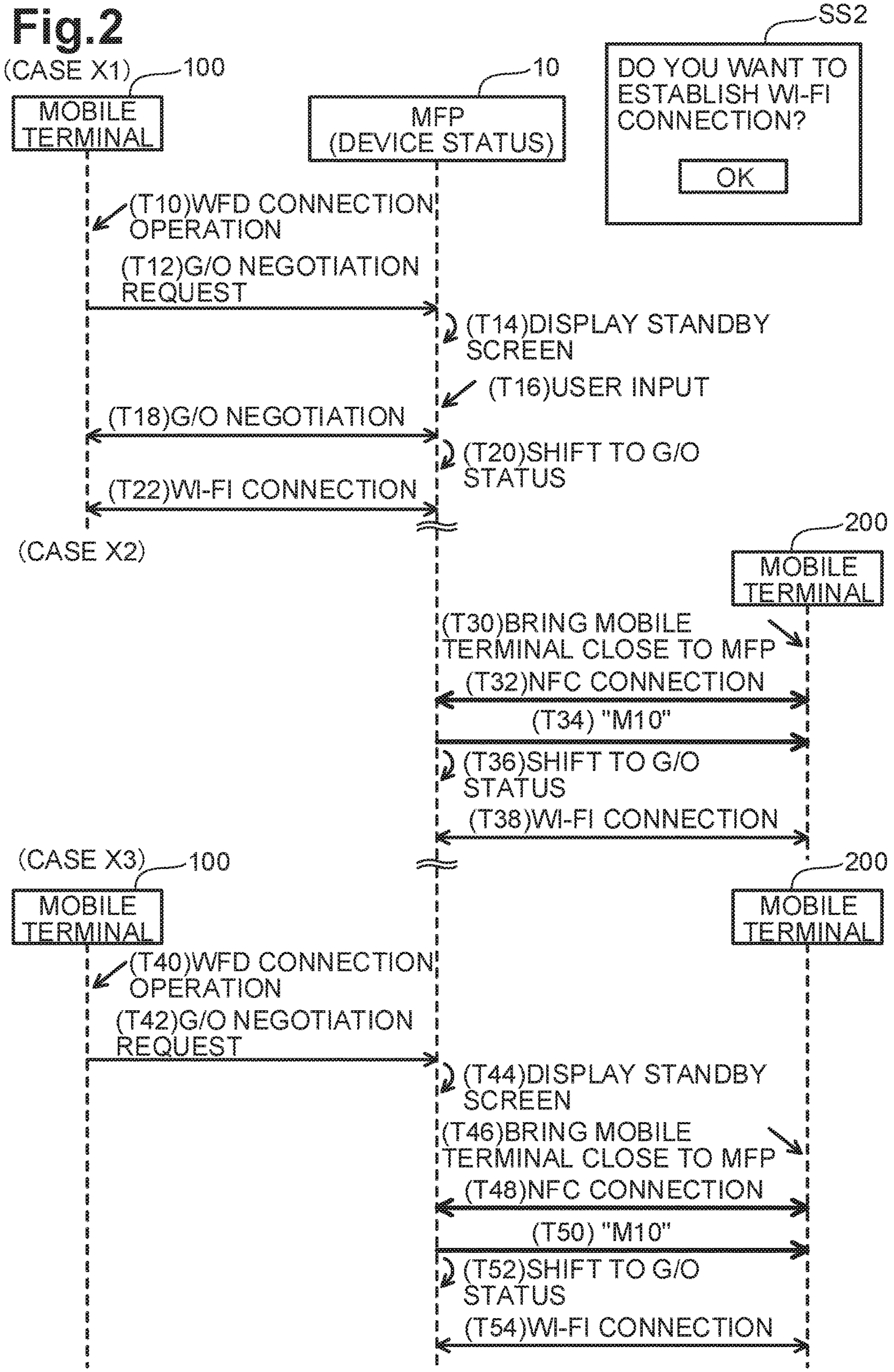
FIG. 2 is a sequence diagram representing interactions between a multifunction peripheral and mobile terminals in each of cases X1, X2, and X3 which may occur when the multifunction peripheral is in a device status in the first embodiment according to one or more aspects of the disclosure.

Cases X1, X2, and X3; FIG. 2

Referring to FIG. 2, example cases X1, X2, and X3 will be described. Cases X1, X2, and X3 occur sequentially when the MFP 10 operates in the device status. In each of cases X1, X2, and X3, the MFP 10 establishes a wireless connection with one of the mobile terminals 100 and 200. Each of cases X1, X2, and X3 helps understanding of processing illustrated in FIGS. 3 and 4. Therefore, actual processing may include one or more other processing that are not executed in cases X1, X2, and X3. Hereinafter, for easier understanding, each processing executed by the CPU 32 of the MFP 100 and each processing executed by the CPU 132 of each of the mobile terminals 100 and 200 will be explained while its corresponding device (i.e., the MFP 10, the mobile terminal 100, or the mobile terminal 200), instead of each CPU itself, is defined as an agent or doer. In the sequence diagrams, thin arrows indicated between the MFP 10 and either of the mobile terminals 100 and 200 represent NFC communication, and thick arrows indicated between the MFP 10 and either of the mobile terminals 100 and 200 represent Wi-Fi® communication.

In case X1, where a WFD connection operation is performed on the operation interface 112 of the mobile terminal 100, a Wi-Fi® connection becomes established between the MFP 10 having the device status and the mobile terminal 100. In step T10, the mobile terminal 100 accepts a WFD connection operation performed on the operation interface 112 by a user of the mobile terminal 100. In response, in step T12, the mobile terminal 100 transmits a G/O negotiation request to the MFP 10.

In step T14, in response to receipt of the G/O negotiation request from the mobile terminal 100 in step T12, the MFP 10 displays a standby screen SS2 on the display 14. In step T16, the MFP 10 accepts user input as selecting an OK button on the standby screen SS2 by the user of the mobile terminal 100. In response, in step T18, the MFP 10 executes a G/O negotiation with the mobile terminal 100.

In case X1, it is determined, as a result of the G/O negotiation, that the MFP 10 becomes a G/O. Thus, in step T20, the MFP 10 shifts to the G/O status from the device status. Thereafter, the MFP 10 executes connection processing for establishing a connection with the mobile terminal 100. Thus, in step T22, the MFP 10 establishes a Wi-Fi® connection with the mobile terminal 100.

In case X2, establishment of a Wi-Fi® connection between the MFP 10 and the mobile terminal 200 is triggered by establishment of an NFC connection therebetween. In step T30, a user brings the mobile terminal 200 close to the MFP 10. In response, in step T32, an NFC connection is established between an NFC I/F (not illustrated) of the mobile terminal 200 and the NFC I/F 22 of the MFP 10.

In step T34, in response to the establishment of the NFC connection in step T32, the MFP 10 transmits the own MAC address "M10" to the mobile terminal 200 through the NFC connection. In step T36, the MFP 10 shifts from the device status to the G/O status. Thereafter, the MFP 10 executes connection processing for establishing a connection with the mobile terminal 200. Thus, in step T38, the MFP 10 establishes a Wi-Fi® connection with the mobile terminal 200.

In case X3, while the standby screen SS2 is displayed on the MFP 10 in case X1, an NFC connection becomes established between the MFP 10 and the mobile terminal 200. Processing executed in each of steps T40 to T44 is the same or similar to the processing executed in each of steps T10 to T14, respectively, described in case X1. While the standby screen SS2 is displayed (i.e., prior to acceptance of user input to the OK button), in step T46, a user brings the mobile terminal 200 close to the MFP 10. In response, in step T48, an NFC connection is established between an NFC I/F (not illustrated) of the mobile terminal 200 and the NFC I/F 22 of the MFP 10. Processing executed in each of steps T48 to T54 is the same or similar to the processing executed in each of steps T32 to T38, respectively, included in case X2. As described above, if the MFP 10 establishes an NFC connection with the mobile terminal 200 while displaying the standby screen in response to receipt of a G/O negotiation request from the mobile terminal 100, the MFP 10 gives a higher priority to establishment of a Wi-Fi® connection with the mobile terminal 200 than establishment of a Wi-Fi® connection with the mobile terminal 100.

Figure 3:
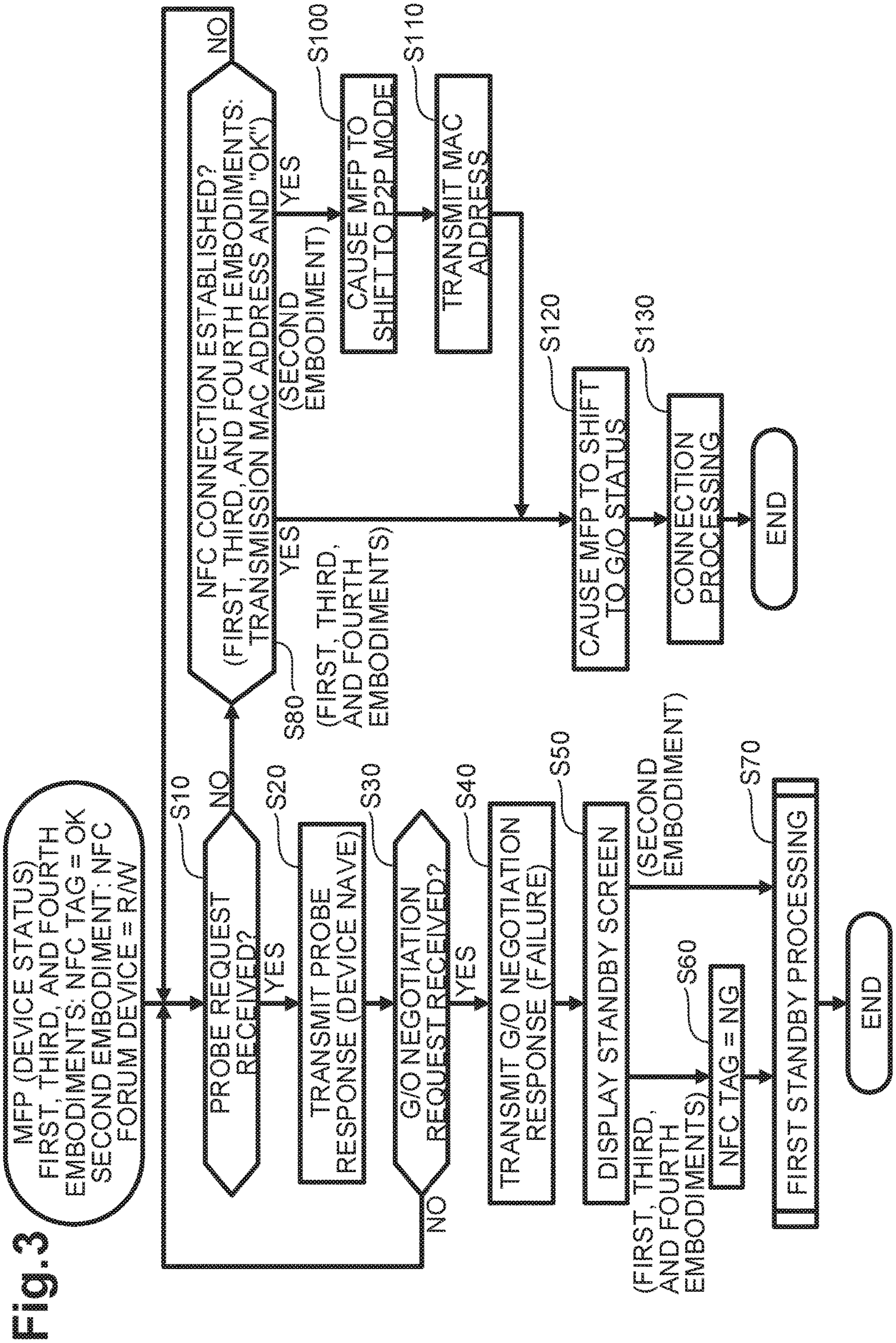
FIG. 3 is a flowchart of operations executed by the multifunction peripheral having the device status in the first embodiment according to one or more aspects of the disclosure.
Figure 4:
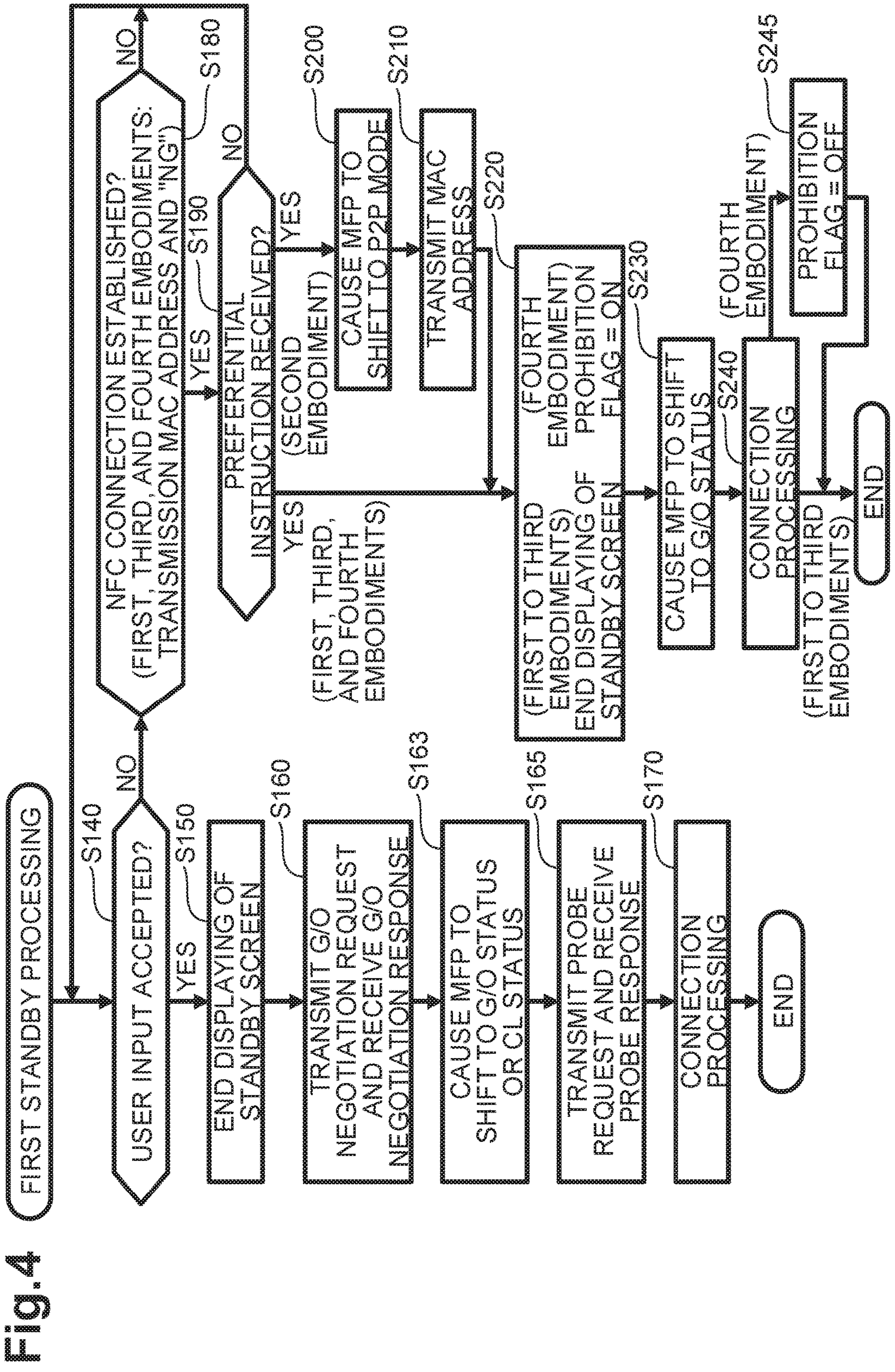
FIG. 4 is a flowchart of a first standby processing in the first embodiment according to one or more aspects of the disclosure.

Processing to be Executed by MFP 10 Having Device Status; FIGS. 3 and 4

Hereinafter, referring to FIGS. 3 and 4, an explanation will be provided on processing to be executed by the CPU 32 of the MFP 10 having the device status in accordance with the program 36. Cases X1, X2, and X3 (refer to FIG. 2) are each implemented by the processing illustrated in FIGS. 3 and 4.

When the MFP 10 is in a status where a WFD function is disabled (hereinafter, referred to as the "WFD-function disenabled status") (i.e., when the MFP 10 is in none of the G/O status, the CL status, and the device status), in response to acceptance of input of an operation for enabling the WFD function on the operation interface 12, the MFP 10 starts operating in the device status. When the MFP 10 operates in the WFD-function disenabled status, the CPU 32 is not allowed to execute processing for establishing a Wi-Fi® connection that complies with the WFD protocol (e.g., processing of step S10). When the MFP 10 operates in the device status, the CPU 32 is allowed to execute the processing for establishing a Wi-Fi® connection that complies with the WFD protocol. where the MFP 10 shifts to the device status from the WFD-function disenabled status, the CPU 32 stores the MAC address "M10" and the information "OK" in a memory (not illustrated) of the NFC I/F 22. The information "OK" may indicate that the MFP 10 is allowed to establish a Wi-Fi® connection with an external device with being triggered by establishment of an NFC connection with the external device.

In step S10, the CPU 32 monitors receipt of a Probe request from a mobile terminal (e.g., the mobile terminal 100) via the Wi-Fi® I/F 20. The Probe request is a signal broadcasted by a mobile terminal (i.e., a signal whose destination is not specified) in order to search one or more devices targeted for establishment of a Wi-Fi® connection with the mobile terminal. In step S20, in response to receipt of a Probe request (e.g., YES in step S10), the MFP 10 transmits a Probe response including the MAC address "M10" and the device name "D10" to the mobile terminal via the Wi-Fi® I/F 20. Hereinafter, the mobile terminal that is the sender of the Probe request in step S10 is referred to as the "first mobile terminal".

In step S30, the CPU 32 monitors receipt of a G/O negotiation request from the first mobile terminal via the Wi-Fi® I/F 20. The G/O negotiation request is a signal for requesting the MFP 10 to establish a Wi-Fi® connection. More specifically, the G/O negotiation request is a signal for requesting the MFP 10 to execute communication called G/O negotiation. The G/O negotiation is communication for determining which one of the MFP 10 and the first mobile terminal should operate as a master station (i.e., a G/O). In step S40, in response to receipt of a G/O negotiation request (e.g., YES in step S30 (refer to step T12 or T42 in FIG. 2)), the CPU 32 transmits a G/O negotiation response to the first mobile terminal via the Wi-Fi® I/F 20. The G/O negotiation response transmitted in step S40 includes information "Failure" indicating that a G/O negotiation is not allowed to be executed. Thus, at this moment, determination for determining in which status, the G/O or CL, the MFP 10 should operate is not executed.

In step S50, the CPU 32 displays the standby screen on the display 14 (refer to step T14 or T44 in FIG. 2). The standby screen is for waiting for input of a user operation for establishing a Wi-Fi® connection with the first mobile terminal. More specifically, for example, the standby screen includes the OK button and a message prompting the user to determine whether to allow the MFP 10 to establish a Wi-Fi® connection with the first mobile terminal.

In step S60, the CPU 32 overwrites the existing information "OK" with the information "NG" in the memory of the NFC I/F 22. The information "NG" may indicate that the MFP 10 is not allowed to establish a Wi-Fi® connection with an external device with being triggered by establishment of an NFC connection with the external device. In step S70, the CPU 32 executes first standby processing (refer to FIG. 4).

As illustrated in FIG. 4, in step S140, the CPU 32 monitors user input to the OK button on the standby screen. In step S150, in response to acceptance of user input to the OK button (e.g., YES in step S140 (refer to step T16 in FIG. 2)), the CPU 32 ends the displaying of the standby screen.

In step S160, the CPU 32 transmits a G/O negotiation request to the first mobile terminal via the Wi-Fi® I/F 20, and receives a G/O negotiation response from the first mobile terminal via the Wi-Fi® I/F 20 (e.g., step T18 in FIG. 2). The G/O negotiation request includes an Intent value indicating an index of possibility that the MFP 10 becomes a G/O. The G/O negotiation response includes an Intent value indicating an index of possibility that the first mobile terminal becomes a G/O. The CPU 32 determines which one of the MFP 10 and the first mobile terminal should become a G/O by comparing the Intent values. As such a comparison, the CPU 32 determines that MFP 10 operates as one of the G/O and the CL. In step S163, the CPU 32 causes the MFP 10 to shift to the determined status, e.g., the G/O status or the CL status.

Where the MFP 10 shifts to the G/O status in step S163 (refer to step T20 in FIG. 2), the CPU 32 generates a Service Set identifier ("SSID") and a password. The SSID is an identifier for identifying a WFDNW in which the MFP 10 operates as a G/O. The password is to be used in authentication and encryption in the WFDNW. In step S165, the CPU 32 receives a Probe request from the first mobile terminal via the Wi-Fi® I/F 20. The Probe request transmitted in step S165 in such a case includes the MAC address "M10" of the MFP 10. The Probe request is a signal unicasted by the first mobile terminal (i.e., a signal whose destination is specified) in order to request a specific device (e.g., the MFP 10) to establish a Wi-Fi® connection therebetween. In response to receipt of the Probe request from the first mobile terminal, the CPU 32 transmits a Probe response including the generated SSID and information "Device Password ID=0x0004" to the first mobile terminal. The information "Device Password ID=0x0004" may indicate that Wi-Fi® connection processing using the WPS is allowed to be executed. Thus, the MFP 10 may notify the first mobile terminal that the first mobile terminal is not allowed to establish a Wi-Fi® connection with the MFP 10.

In step S170, the CPU 32 executes connection processing for establishing a connection with the first mobile terminal (e.g., communication such as Wi-Fi Simple Configuration ("WSC") Exchange, Authentication, Association, four-way handshake). More specifically, for example, the CPU 32 transmits the SSID and the password to the first mobile terminal in WSC Exchange which is communication that complies with the PBC protocol of the WPS. The CPU 32 receives the SSID and the password from the first mobile terminal and authenticates the received SSID and password. As a result, the MFP 10 establishes a Wi-Fi® connection with the first mobile terminal and allows the first mobile terminal to participate as a slave station (i.e., a CL) in the WFDNW in which the MFP 10 operates as a master station (i.e., a G/O) (refer to step T22 in FIG. 2).

Where the MFP 10 shifts to the CL status in step S163, in step S165, the MFP 10 transmits a Probe request to the first mobile terminal via the Wi-Fi® I/F 20. The Probe request transmitted in step S165 in such a case includes the MAC address "M100" of the first mobile terminal. Then, in step S165, the CPU 32 receives a Probe request including an SSID from the first mobile terminal via the Wi-Fi® I/F 20. The SSID is an identifier for identifying a WFDNW in which the first mobile terminal operates as a G/O and is generated by the first mobile terminal. In step S170, the CPU 32 executes connection processing for establishing a connection with the first mobile terminal (e.g., communication such as Wi-Fi Simple Configuration ("WSC") Exchange, Authentication, Association, four-way handshake). More specifically, for example, the CPU 32 receives the SSID and the password from the first mobile terminal in WSC Exchange. The CPU 32 transmits the SSID and the password to the first mobile terminal and allows the first mobile terminal to authenticate the SSID and the password. As a result, the MFP 10 establishes a Wi-Fi® connection with the first mobile terminal and is allowed to participate as a slave station (i.e., a CL) in the WFDNW in which the first mobile terminal operates as a master station (i.e., a G/O).

Returning to FIG. 3, in step S80, while the CPU 32 monitors receipt of a Probe request from the first mobile terminal in step S10, the CPU 32 monitors establishment of an NFC connection with another mobile terminal (e.g., the mobile terminal 200) via the NFC I/F 22. When a user brings a mobile terminal close to the MFP 10, a distance between an NFC I/F of the mobile terminal and the NFC I/F 22 of the MFP 10 becomes less than the maximum distance for establishing an NFC connection (e.g., 10 cm). Thus, an NFC connection is established between the MFP 10 and the mobile terminal (refer to step T32 in FIG. 2). If the CPU 32 determines that information indicating that an NFC connection has been established has been received from the NFC I/F 22 (e.g., YES in step S80), the routine proceeds to step S120. Hereinafter, the mobile terminal with which the MFP 10 establishes the NFC connection in step S80 is referred to as the "second mobile terminal". Before or after the CPU 32 determines that the NFC connection has been established, the NFC I/F 22 transmits the MAC address "M10" and the information "OK" stored in the memory of the NFC I/F 22 to the second mobile terminal through the NFC connection (refer to step T34 in FIG. 2). Thus, the MFP 10 may notify the second mobile terminal that the second mobile terminal is allowed establish a Wi-Fi® connection with the MFP 10 having the MAC address "M10" with being triggered by establishment of the NFC connection therebetween.

In step S120, the CPU 32 causes the MFP 10 to shift from the device status to the G/O status (refer to step T46 in FIG. 2). In step S540, the CPU 32 also generates an SSID and a password. In step S130, the CPU 32 executes connection processing for establishing a connection with the second mobile terminal via the Wi-Fi® I/F 20. More specifically, in response to receipt of a Probe request broadcasted by the second mobile terminal, the CPU 32 transmits a Probe response including the MAC address "M10" and the generated SSID to the second mobile terminal. The MAC address "M10" has been transmitted to the second mobile terminal in step S80. Therefore, transmission of a Probe response including the MAC address "M10" to the second mobile terminal enables the second mobile terminal to be notified of existence of the MFP 10 which is a connection target. In response to receipt of a Provision Discovery request from the second mobile terminal, the CPU 32 transmits a Provision Discovery response to the second mobile terminal. The Provision Discovery request is a signal for requesting establishment of a Wi-Fi® connection. Signal communication (e.g., a Probe request transmitted through unicast, a Probe response, WSC Exchange, Authentication, Association, WPS, 4-way handshake) executed thereafter is the same or similar to the processing executed in each of steps S165 and S170 in FIG. 4 when the MFP 10 is in the G/O status. Nevertheless, the Probe request is different from the Probe request transmitted in step S165 in FIG. 4. More specifically, for example, the Probe request includes the generated SSID as the destination. As a result, the MFP 10 establishes a Wi-Fi® connection with the second mobile terminal and allows the second mobile terminal to participate as a slave station (i.e., a CL) in the WFDNW in which the MFP 10 operates as a master station (i.e., a G/O) (refer to step T38 in FIG. 2).

The first standby processing (refer to FIG. 4) will be further described below. In step S180, while the CPU 32 monitors user input to the OK button on the standby screen in step S140, the CPU 32 monitors establishment of an NFC connection with another mobile terminal (e.g., the mobile terminal 200) via the NFC I/F 22. If the CPU 32 determines that the MFP 10 has established an NFC connection with a mobile terminal via the NFC I/F 22 (e.g., YES in step S180) prior to acceptance of user input to the OK button on the standby screen in step S140 (e.g., NO in step S140), the routine proceeds to step S190. Hereinafter, the mobile terminal with which the MFP 10 has established an NFC connection in step S180 is referred to as the "third mobile terminal". The NFC I/F 22 transmits the MAC address "M10" and the information "NG" (refer to step S60 in FIG. 3) stored in the memory of the NFC I/F 22 to the third mobile terminal through the established NFC connection (refer to step T50 in FIG. 2).

In step S190, the CPU 32 determines whether a preferential instruction has been received from the third mobile terminal through the NFC connection established in step 5180. Where the third mobile terminal has the MFP application 138 installed thereon, the preferential instruction is transmitted to the MFP 10 by the third mobile terminal. Where the third mobile terminal does not have the MFP application 138 installed thereon, the preferential instruction is not transmitted to the MFP 10 by the third mobile terminal. The preferential instruction is for requesting the MFP 10 to give a higher priority to establishment of a Wi-Fi® connection with the third mobile terminal than establishment of a Wi-Fi® connection with the first mobile terminal in a state where the MFP 10 is waiting for input of a user operation for establishing a Wi-Fi® connection with the first mobile terminal. If the CPU 32 determines that a preferential instruction has been received from the third mobile terminal (e.g., YES in step S190), the routine proceeds to step S220. If the CPU 32 determines that a preferential instruction has not been received from the third mobile terminal (e.g., NO in step S190), the routine returns to step S140 (i.e., the CPU 32 does not execute processing of step S220 and its subsequent steps). As described above, if the CPU 32 determines that a preferential instruction has not been received from the third mobile terminal, i.e., if the third mobile terminal does not have the MFP application 138 installed thereon, the MFP 10 is not allowed to establish a Wi-Fi® connection with the third mobile terminal. Thus, the CPU 32 does not execute processing of step S220 and its subsequent steps. Therefore, in response to acceptance of user input to the standby screen, the MFP 10 is allowed to establish a Wi-Fi® connection with the first mobile terminal successfully (e.g., YES in step S140, and steps S160 to S170).

In step S220, the CPU 32 ends the displaying of the standby screen. The disappearance of the standby screen enables the user not to perform any operation on the standby screen. This configuration may therefore avoid or reduce an occurrence of an unintended event, such as user input to the standby screen, during execution of processing for establishing a Wi-Fi® connection with the third mobile terminal. Processing executed in each of steps S230 and S240 is the same or similar to the processing executed in each of steps S120 and S130, respectively, in FIG. 3 (refer to steps T52 and T54 FIG. 2).

Figure 5:
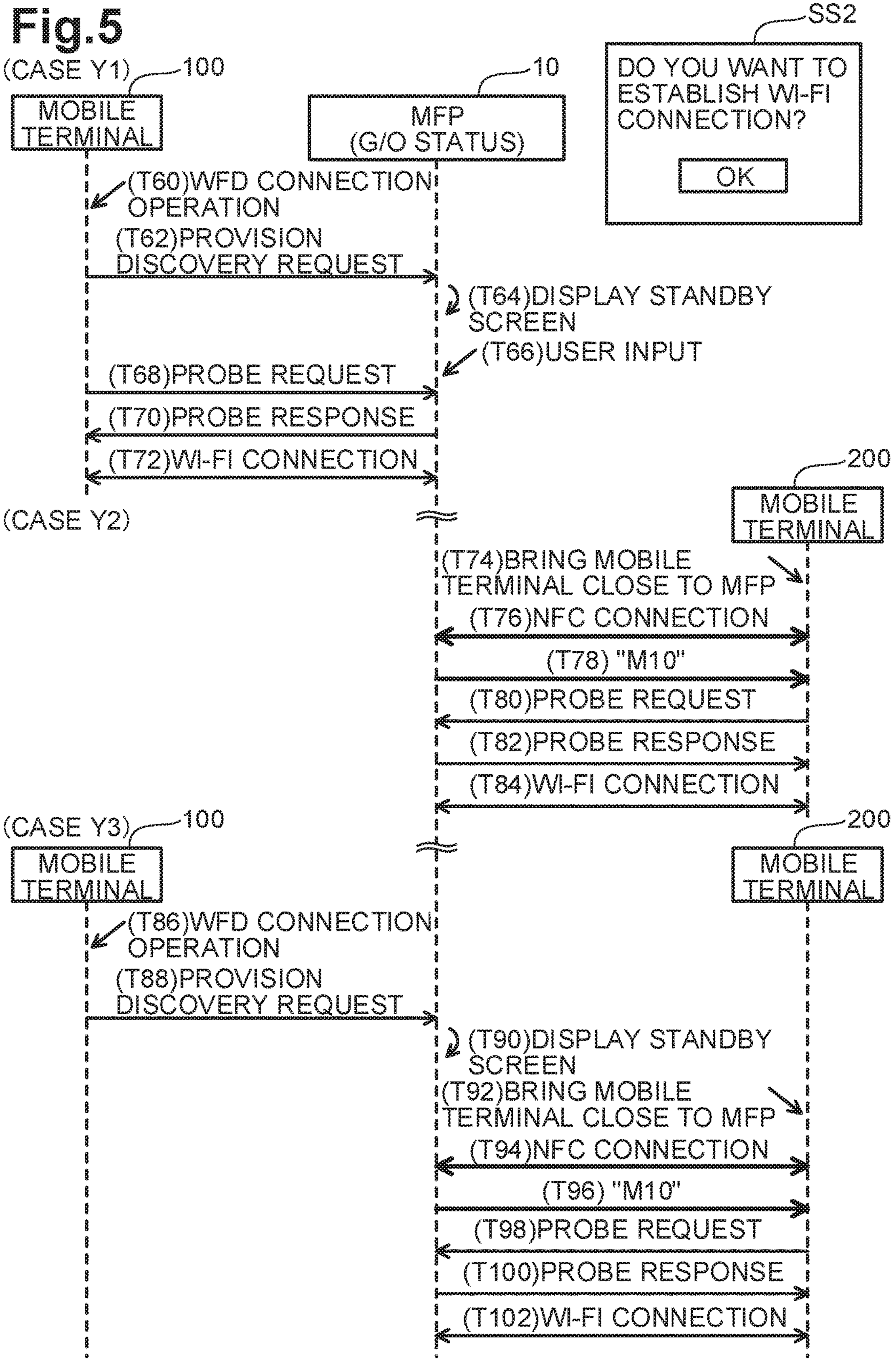
FIG. 5 is a sequence diagram representing interactions between a multifunction peripheral and mobile terminals in each of cases Y1, Y2, and Y3 which occur when the multifunction peripheral is in a Group Owner ("G/O") status in the first embodiment according to one or more aspects of the disclosure.

Cases Y1, Y2, and Y3; FIG. 5

Referring to FIG. 5, example cases Y1, Y2, and Y3 will be described. Cases Y1, Y2, and Y3 occur sequentially when the MFP 10 operates in the G/O status. In each of cases Y1, Y2, and Y3, the MFP 10 establishes a wireless connection with one of the mobile terminals 100 and 200. Each of cases Y1, Y2, and Y3 helps understanding of processing illustrated in FIGS. 6 and 7. Therefore, actual processing may include one or more other processing that are not executed in cases Y1, Y2, and Y3.

In case Y1, where a WFD connection operation is performed on the operation interface 112 of the mobile terminal 100, a Wi-Fi® connection becomes established between the MFP 10 having the G/O status and the mobile terminal 100. In step T62, in response to acceptance of a WFD connection operation performed on the operation interface 112 by the user of the mobile terminal 100 in step T60, the mobile terminal 100 transmits a Provision Discovery request to the MFP 10.

In step T64, in response to receipt of the Provision Discovery request from the mobile terminal 100 in step T62, the MFP 10 displays the standby screen on the display 14. In step T66, the MFP 10 accepts input to the OK button on the standby screen by the user of the mobile terminal 100. In step T70, in response to receipt of a Probe request from the mobile terminal 100 in step T68, the MFP 10 transmits a Probe response to the mobile terminal 100. Thereafter, the MFP 10 executes connection processing for establishing a connection with the mobile terminal 100. Thus, in step T72, the MFP 10 establishes a Wi-Fi® connection with the mobile terminal 100.

In case Y2, establishment of a Wi-Fi® connection between the MFP 10 and the mobile terminal 200 is triggered by establishment of an NFC connection therebetween. In step T74, the user brings the mobile terminal 200 close to the MFP 10. In response, in step T76, an NFC connection is established between the NFC I/F (not illustrated) of the mobile terminal 200 and the NFC I/F 22 of the MFP 10.

In step T78, in response to the establishment of the NFC connection in step T76, the MFP 10 transmits the own MAC address "M10" to the mobile terminal 200 through the NFC connection. In step T82, in response to receipt of a Probe request from the mobile terminal 200 in step T80, the MFP 10 transmits a Probe response to the mobile terminal 200. Thereafter, the MFP10 executes connection processing for establishing a connection with the mobile terminal 100. Thus, in step T84, the MFP 10 establishes a Wi-Fi® connection with the mobile terminal 100.

In case Y3, while the standby screen is displayed on the MFP 10 in case Y1, an NFC connection becomes established between the MFP 10 and the mobile terminal 200. Processing executed in each of steps T86 to T90 is the same or similar to the processing executed in each of steps T60 to T64, respectively, included in case Y1. While the standby screen is displayed (i.e., prior to acceptance of user input to the OK button), in step T92, a user brings the mobile terminal 200 close to the MFP 10. In response, in step T94, an NFC connection is established between the NFC I/F (not illustrated) of the mobile terminal 200 and the NFC I/F 22 of the MFP 10. Processing executed in each of steps T96 to T102 is the same or similar to the processing executed in each of steps T78 to T84, respectively, included in case Y2. As described above, if the MFP 10 establishes an NFC connection with the mobile terminal 200 while displaying the standby screen in response to receipt of a Provision Discovery request from the mobile terminal 100, the MFP 10 establishes a Wi-Fi® connection with the mobile terminal 200.

Figure 6:
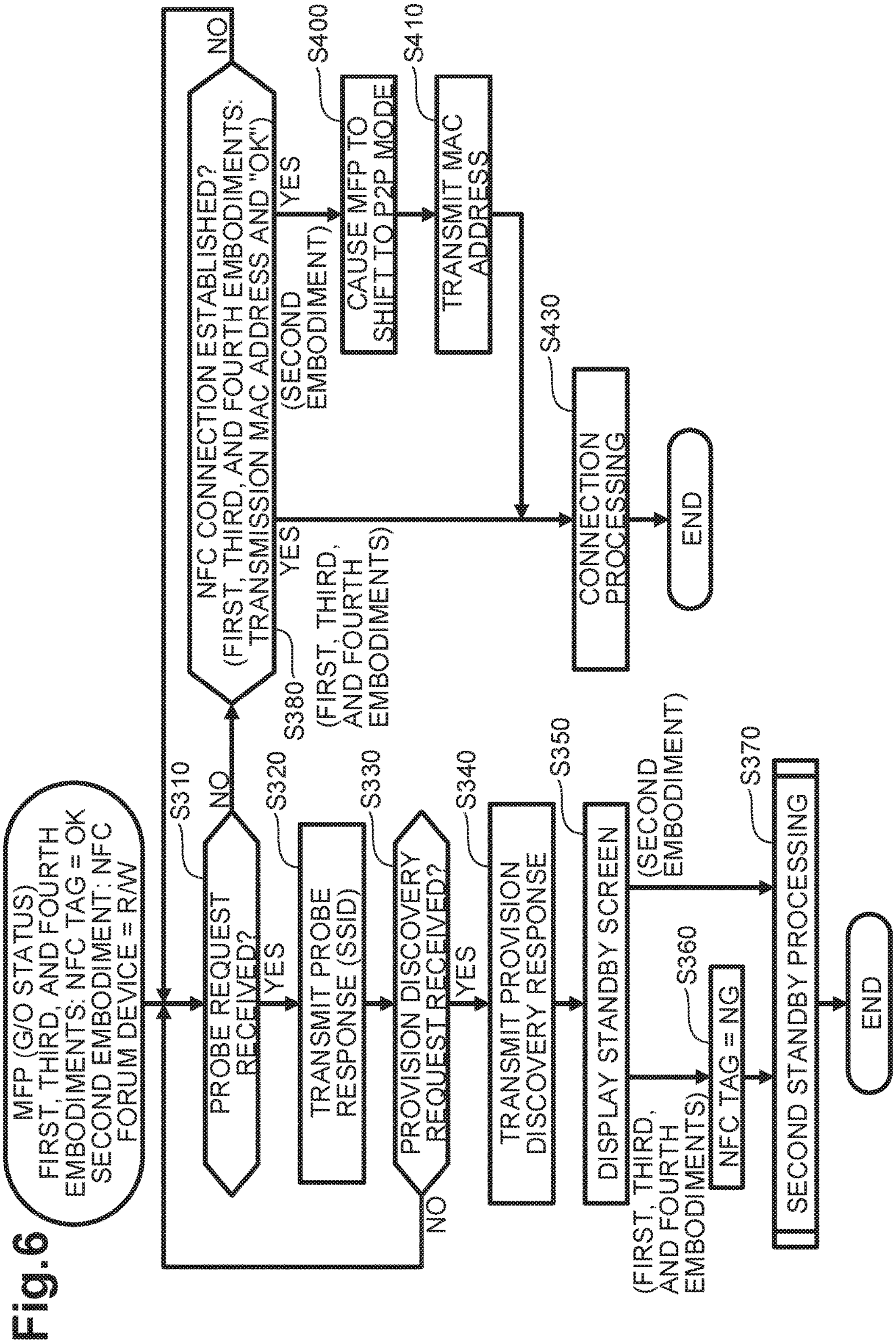
FIG. 6 is a flowchart of processing executed by the multifunction peripheral having the G/O status in the first embodiment according to one or more aspects of the disclosure.
Figure 7:
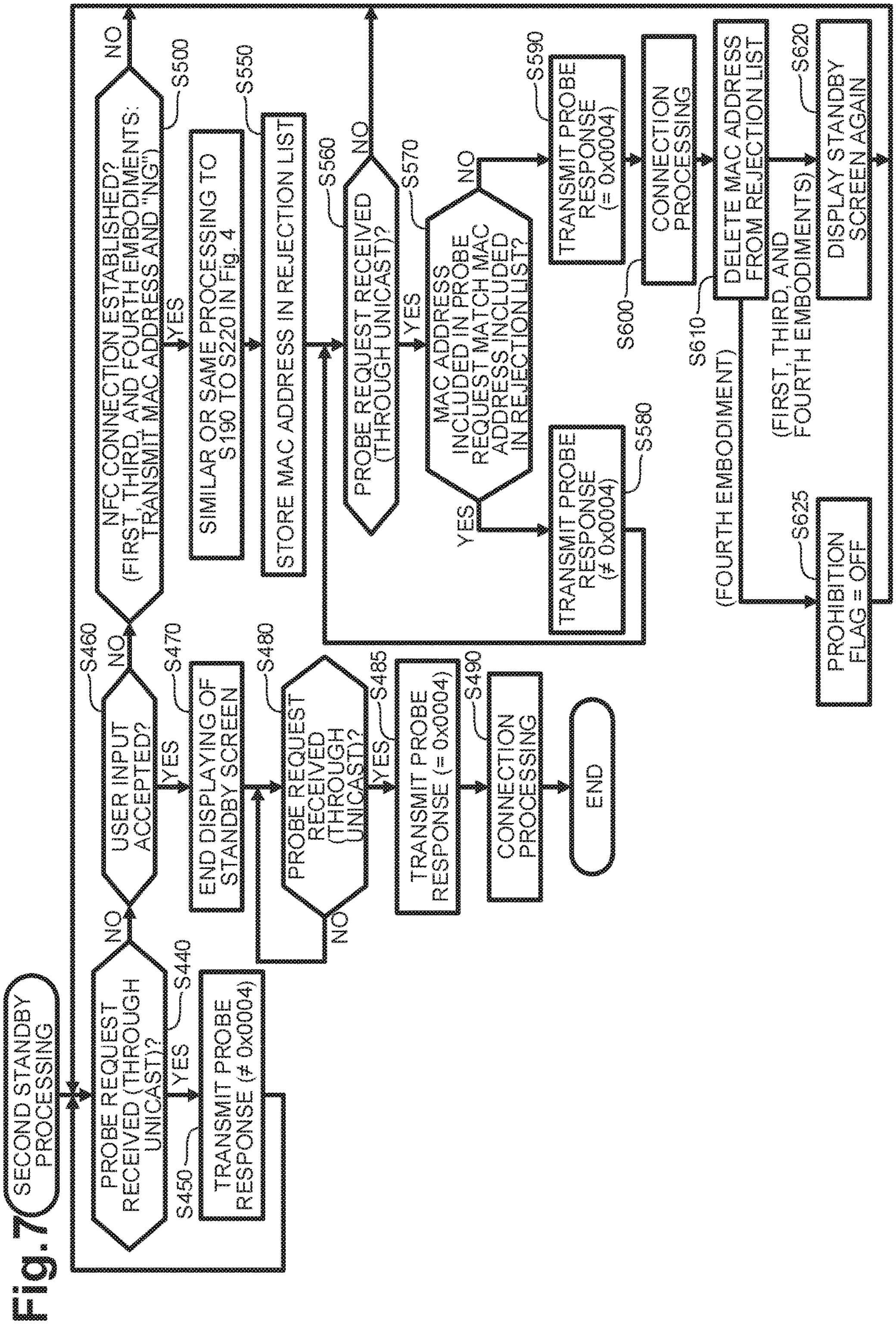
FIG. 7 is a flowchart of a second standby processing in the first embodiment according to one or more aspects of the disclosure.

Processing to be Executed by MFP 10 Having G/O Status; FIGS. 6 and 7

Hereinafter, referring to FIGS. 6 and 7, an explanation will be provided on processing to be executed by the CPU 32 of the MFP 10 having the G/O status in accordance with the program 36. Cases Y1, Y2, and Y3 (refer to FIG. 5) are implemented by the processing illustrated in FIGS. 6 and 7.

Where a user operation for causing the MFP 10 to shift to the G/O status is performed on the operation interface 12 while the MFP 10 operates in the device status, the MFP 10 shifts to the G/O status. At that time, the MFP 10 generates an SSID and a password to be used in the WFDNW in which the MFP 10 operates as a master station (e.g., a G/O).

Processing executed in step S310 is the same or similar to the processing executed in step S10 in FIG. 3. Processing executed in step S320 is similar to the processing executed in step S20 in FIG. 3. Nevertheless, although the MFP 10 transmits a Probe response including the device name "D1" to the first mobile terminal in step S20 in FIG. 3, in step S320, the MFP 10 transmits a Probe response including the SSID to the first mobile terminal.

In step S330, the CPU 32 monitors receipt of a Provision Discovery request from the first mobile terminal via the Wi-Fi® I/F 20. The Provision Discovery request is a signal for requesting the MFP 10 to establish a Wi-Fi® connection. The Provision Discovery request may include the MAC address of the first mobile terminal. In step S340, in response to receipt of a Provision Discovery request (e.g., YES in step S330 (refer to step T62 or T88 in FIG. 5)), the CPU 32 transmits a Provision Discovery response to the first mobile terminal via the Wi-Fi® I/F 20. Processing executed in each of steps S350 and S360 is the same or similar to the processing executed in each of steps S50 and S60, respectively, in FIG. 3 (refer to step T64 or T90 in FIG. 5). In step S370, the CPU 32 executes second standby processing (refer to FIG. 7).

In step S440 in FIG. 7, the CPU 32 monitors receipt of a Probe request unicasted by the first mobile terminal, i.e., the CPU 32 monitors receipt of a Probe request including the SSID transmitted in step S320 in FIG. 6 as the destination, via the Wi-Fi® I/F 20. In step S450, in response to the receipt of a Probe request (e.g., YES in step S440), the CPU 32 transmits a Probe response to the first mobile terminal via the Wi-Fi® I/F 20. At this moment, a user operation has not been performed on the standby screen. Therefore, the Probe response does not includes the information "Device Password ID=0x0004". Thus, the MFP 10 may notify the first mobile terminal that the first mobile terminal is not allowed to establish a Wi-Fi® connection with the MFP 10. Thus, connection processing using the WPS is not executed between the MFP 10 and the first mobile terminal.

Processing executed in each of steps S460 and S470 is the same or similar to the processing executed in each of steps S140 and S150, respectively, in FIG. 4 (refer to step T66 in FIG. 5). Processing executed in each of steps S480 and S485 is similar to the processing executed in each of steps S440 and S450, respectively, in FIG. 7 (refer to steps T70 and T72 in FIG. 5). Nevertheless, although the MFP 10 transmits a Probe response not including the information "Device Password ID=0x0004" in step S410, the MFP 10 transmits a Probe response including the information "Device Password ID=0x0004" in step S460. Thus, the MFP 10 may notify the first mobile terminal that the first mobile terminal is allowed to establish a Wi-Fi® connection with the MFP 10. Thus, in step S490, connection processing using the WPS is executed between the MFP 10 and the first mobile terminal. Processing executed in step S490 is the same or similar to the processing executed in step S170 in FIG. 4 when the MFP 10 is in the G/O status. As a result, the MFP 10 establishes a Wi-Fi® connection with the first mobile terminal and allows the first mobile terminal to participate as a slave station (i.e., a CL) in the WFDNW in which the MFP 10 operates as a master station (i.e., a G/O) (refer to step T72 in FIG. 5).

Returning to FIG. 6, processing executed in each of steps S380 and S430 is the same or similar to the processing executed in each of steps S80 and S130, respectively, in FIG. 3. As a result, the MFP 10 establishes a Wi-Fi® connection with the second mobile terminal and allows the second mobile terminal to participate as a slave station (i.e., a CL) in the WFDNW in which the MFP 10 operates as a master station (i.e., a G/O) (refer to steps T76 to T84 in FIG. 5).

The second standby processing (refer to FIG. 7) will be further described below. Processing executed in step S500 is the same or similar to the processing executed in step S180 in FIG. 4. If the CPU 32 determines that an NFC connection has been established with the third mobile terminal in step S500, the CPU 32 executes processing that are the same or similar to the processing executed in each of steps S190 to S220 in FIG. 4 (refer to steps T94 and T95 in FIG. 5).

In step S550, the CPU 32 stores the MAC address of the first mobile terminal in the rejection list 40 in the memory 34. The MAC address is included in the Provision Discovery request received in step S330 in FIG. 6.

In step S560, the CPU 32 monitors receipt of a Probe request transmitted through unicast via the Wi-Fi® I/F 20. The Probe request includes the MAC address of the mobile terminal that transmitted the Probe request. In step S570, in response to receipt of the Prove request (e.g., YES in step S560), the CPU 32 determines whether the MAC address included in the received Probe request matches the MAC address included in the rejection list 40.

If the CPU 32 determines that the MAC address included in the received Probe request matches the MAC address included in the rejection list 40 (e.g., YES in step S570), i.e., if the MFP 10 has received the Probe request from the first mobile terminal, the CPU 32 transmits a Probe response not including the information "Device Password ID=0x0004" to the first mobile terminal. Thus, connection processing using the WPS is not executed between the MFP 10 and the first mobile terminal.

Thus, the MFP 10 is allowed to establish a Wi-Fi® connection with the third mobile terminal successfully (refer to step S600).

If the CPU 32 determines that the MAC address included in the received Probe request does not match the MAC address included in the rejection list 40 (e.g., NO in step S570), i.e., if the MFP 10 has received the Probe request from the third mobile terminal, the CPU 32 transmits a Probe response including the information "Device Password ID=0x0004" to the third mobile terminal.

Thus, in step S600, the CPU 32 executes connection processing for establishing a connection with the third mobile terminal via the Wi-Fi® I/F 20. Processing executed in step S600 is the same or similar to the processing executed in step S240 in FIG. 4. As a result, the MFP 10 establishes a Wi-Fi® connection with the third mobile terminal and allows the third mobile terminal to participate as a slave station (i.e., a CL) in the WFDNW in which the MFP 10 operates as a master station (i.e., a G/O) (refer to step T102 in FIG. 5). As described above, the MFP 10 may be enabled to appropriately determine, by referring to the MAC address included in the rejection list 40, whether to transmit a Probe response not including the information "Device Password ID=0x0004" (e.g., step S580) or transmit a Probe response including the information "Device Password ID=0x0004" (e.g., step S590) (i.e., determine with which one of the mobile terminals should the MFP 10 establish a Wi-Fi® connection).

In step S610, the CPU 32 deletes the MAC address of the first mobile terminal from the rejection list 40. In step S620, the CPU 32 displays the standby screen on the display 14 again. Therefore, in response to acceptance of user input to the standby screen (e.g., YES in step S460), the MFP 10 is allowed to establish a Wi-Fi® connection with the first mobile terminal (e.g., step S490). That is, the MFP 10 is allowed to establish a Wi-Fi® connection with each of the first and third mobile terminals at different timings. More specifically, the MFP 10 is allowed to establish a Wi-Fi® connection selectively with an appropriate one of the first and third mobile terminals at an appropriate timing.

Specific Example Cases Implemented when MFP 11 is in Device Status; FIGS. 8 to 11

Hereinafter, referring to FIGS. 8 to 11, an explanation will be provided on specific example cases to be implemented by the processing illustrated in FIGS. 3 and 4 when the MFP 10 is in the device status.

Figure 8:
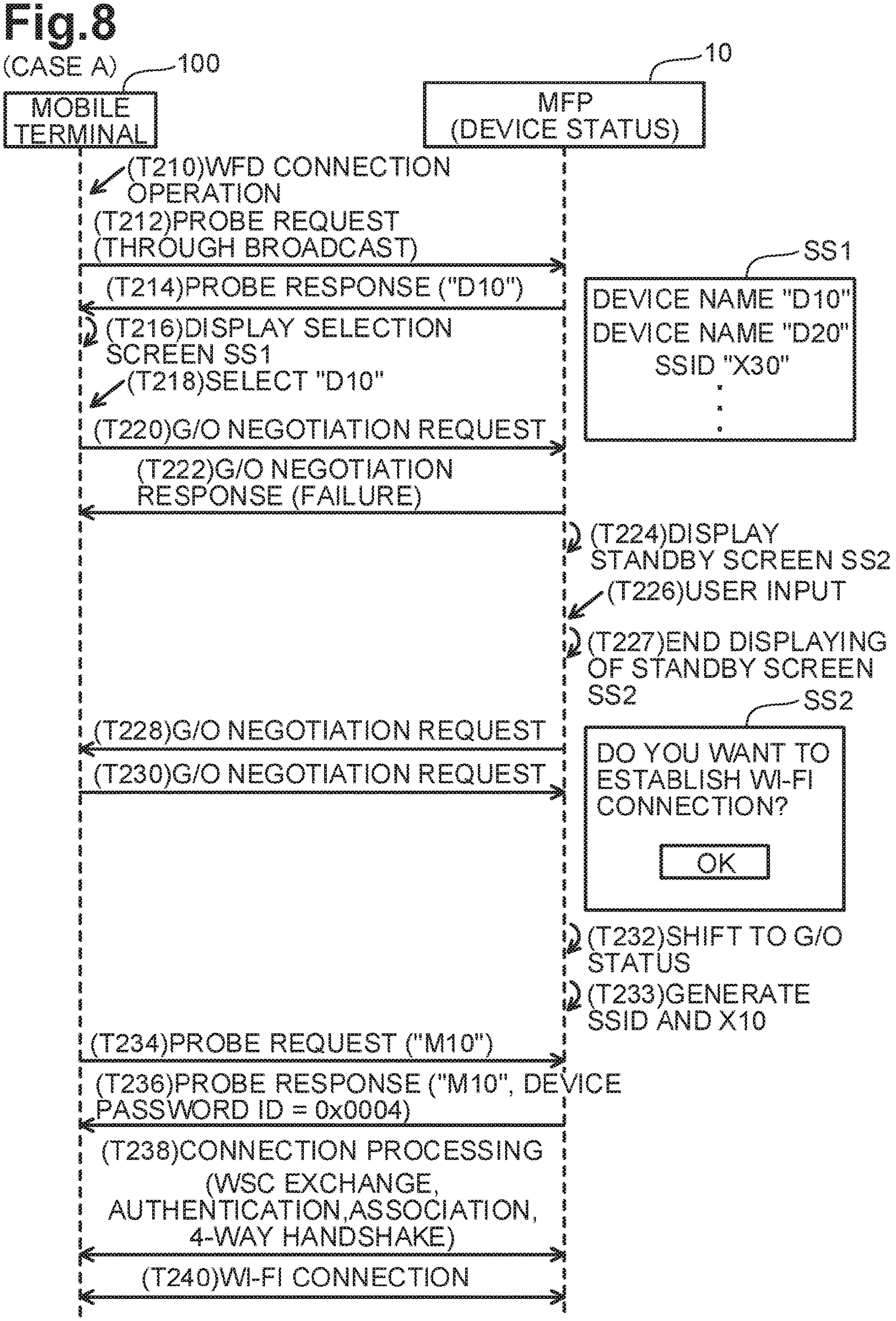
FIG. 8 is a sequence diagram representing interactions between the multifunction peripheral and one of the mobile terminals in case A in which a user input is received while a standby screen is displayed when the multifunction peripheral is in the device status in the first embodiment according to one or more aspects of the disclosure.

Case A; FIG. 8

In case A, where a WFD connection operation is executed on the operation interface 112 of the mobile terminal 100, a Wi-Fi® connection becomes established between the MFP 10 having the device status and the mobile terminal 100. In step T212, in response to acceptance of a WFD connection operation performed on the operation interface 112 by the user of the mobile terminal 100 in step T210, the mobile terminal 100 broadcasts a Probe request to one or more communication devices.

In step T214, in response to receipt of a Probe request from the mobile terminal 100 in step T212 (e.g., YES in step S10 in FIG. 3), the MFP 10 transmits a Probe response including the MAC address "M10" and the device name "D10" to the mobile terminal 100 (e.g., step S20).

In step T216, in response to receipt of the Probe response from the MFP 10 in step T214, the mobile terminal 100 displays, on the display 114, a selection screen SS1 including the device name "D10" included in the Probe response. The mobile terminal 100 may also receive one or more Probe responses from one or more other communication devices (not illustrated). Therefore, the selection screen SS1 may also include, for example, a device name "D20" of another communication device and an SSID "X30" of another wireless network configured by the another communication device. In step T218, the mobile terminal 100 accepts selection of the device name "D10" on the selection screen SS1. In such a case, in step T220, the mobile terminal 100 transmits, to the MFP 10, a G/O negotiation request including the Intent value of the mobile terminal 100.

In step T222, in response to receipt of the G/O negotiation request from the mobile terminal 100 in step T220 (e.g., YES in step S30), the MFP 10 transmits a G/O negotiation response including the information "Failure" to the mobile terminal 100 (e.g., step S40). In step T224, the MFP 10 displays a standby screen SS2 (e.g., step S50). In step T226, the MFP 10 accepts input to the OK button on the standby screen SS2 by the user of the mobile terminal 100 (e.g., YES in step S140 in FIG. 4). In step T227, the CPU 32 ends the displaying of the standby screen SS2 (e.g., step S150). In such a case, in step T228, the MFP 10 transmits, to the mobile terminal 100, a G/O negotiation request including the Intent value of the MFP 10 (e.g., step S160).

In step T230, in response to receipt of a G/O negotiation request from the MFP 10 in step T228, the mobile terminal 100 transmits, to the MFP 10, a G/O negotiation response including the Intent value of the mobile terminal 100. Thus, a G/O negotiation is executed between the MFP 10 and the mobile terminal 100.

In case A, it is determined, as a result of the G/O negotiation, that the MFP 10 becomes a G/O. Therefore, in step T232, the MFP 10 shifts from the device status to the G/O status (e.g., step S163). In step T233, the MFP 10 also generates an SSID "X10" and a password (e.g., step S163).

In step T236, in response to receipt of a Probe request including the MAC address "M10" from the mobile terminal 100 in step T234, the MFP 100 transmits, to the mobile terminal 100, a Probe response including the SSID "X10" and the information "Device Password ID=0x0004" (e.g., step S165). In step T238, the MFP 10 executes connection processing for establishing a connection with the mobile terminal 100 (e.g., communication such as WSC Exchange, Authentication, Association, four-way handshake) (e.g., step S170). As a result, in step T240, the MFP 10 establishes a Wi-Fi® connection with the mobile terminal 100 and allows the mobile terminal 100 to participate as a CL in the WFDNW in which the MFP 10 operates as a G/O.

Figure 9:
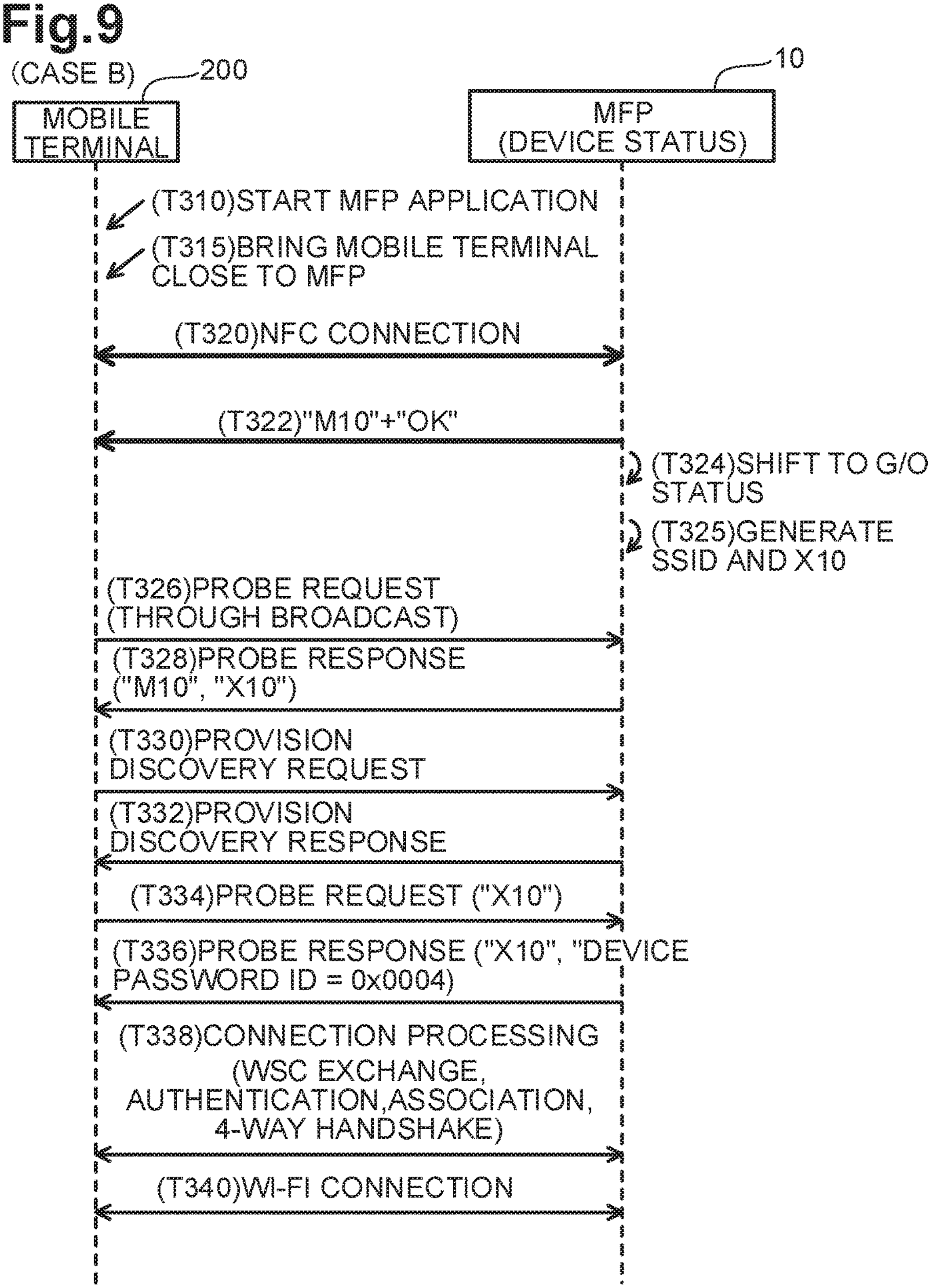
FIG. 9 is a sequence diagram representing interactions between the multifunction peripheral and another of the mobile terminals in case B in which an NFC connection is established when the multifunction peripheral is in the device status in the first embodiment according to one or more aspects of the disclosure.

Case B; FIG. 9

In case B, establishment of a Wi-Fi® connection between the MFP 10 and the mobile terminal 200 is triggered by establishment of an NFC connection therebetween. In response to acceptance of a user operation for starting the application 138, in step T310, the mobile terminal 200 starts the application 138. In step T315, the user brings the mobile terminal 200 close to the MFP 10. In response, in step T320, an NFC connection is established between the NFC I/F (not illustrated) of the mobile terminal 200 and the NFC I/F 22 of the MFP 10.

In step T322, in response to the establishment of the NFC connection in step T320 (e.g., YES in step S80 in FIG. 3), the MFP 10 transmits the MAC address "M10" and the information "OK" to the mobile terminal 200 through the NFC connection. In step T324, the MFP 10 shifts from the device status to the G/O status (e.g., step S120). When the MFP 10 shifts to the G/O status, in step T325, the MFP 10 generates an SSID "X10" and a password.

In step T328, in response to receipt of a Probe request from the mobile terminal 200 in step T326, the MFP 10 transmits a Probe response including the MAC address "M10" and the SSID "X10" to the mobile terminal 200 (e.g., step S130).

The mobile terminal 200 has received the MAC address "M10" from the MFP 10 in the previous step (e.g., step T322). Therefore, even if the mobile terminal 200 receives two or more Probe responses from two or more communication devices including the MFP 10 in step T328, the mobile terminal 200 is enabled to identify the Probe response including the MAC address "M10" among the two or more Probe responses. Thus, the mobile terminal 200 may acquire the SSID "X10" included in the identified Probe response, i.e., the SSID "X10" of the WFDNW in which the mobile terminal 200 is to participate. That is, the mobile terminal 200 may recognize the MFP 10 having the G/O status. Thus, the mobile terminal 200 is enabled to execute subsequent processing for establishing a Wi-Fi® connection with the MFP 10.

In step T332, in response to receipt of a Provision Discovery request from the mobile terminal 200 in step T330, the MFP 10 transmits a Provision Discovery response to the mobile terminal 200 (e.g., step S130). Processing executed in each of steps T334 to T340 is the same or similar to the processing executed in each of steps T234 to T240, respectively, in FIG. 8. Nevertheless, the Probe request transmitted in step T334 is different from the Probe request transmitted in step T234 in FIG. 8. More specifically, for example, the Probe request transmitted in step T334 includes the SSID "X10" as the destination.

Figure 10:
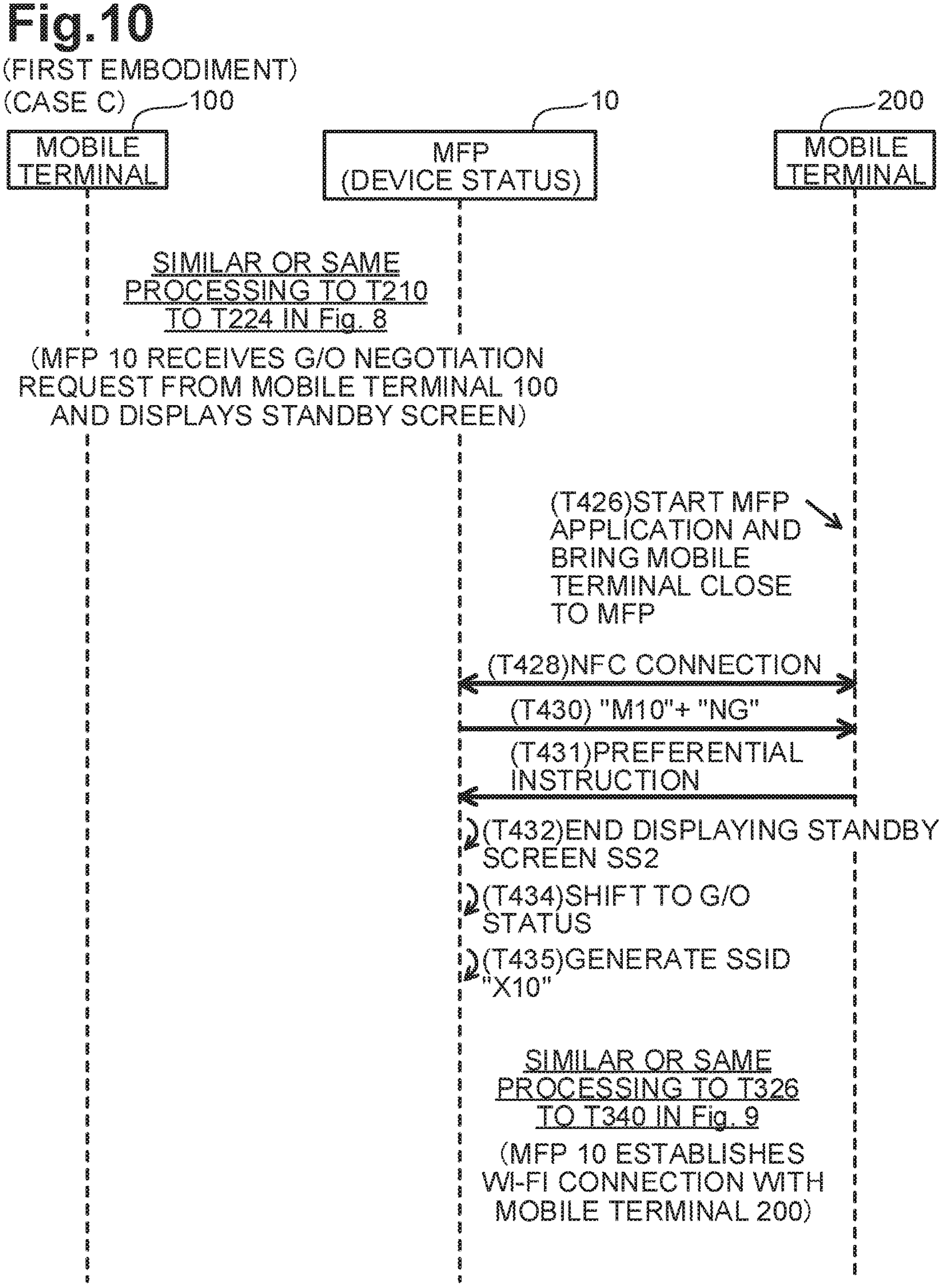
FIG. 10 is a sequence diagram representing interactions between the multifunction peripheral and the mobile terminals in case C in which an NFC connection is established when the multifunction peripheral is in the device status and the standby screen is displayed in the first embodiment according to one or more aspects of the disclosure.

Case C; FIG. 10

In case C, while the standby screen SS2 is displayed on the MFP 10 in case A (refer to FIG. 8), an NFC connection becomes established between the MFP 10 and the mobile terminal 200. The MFP 10 executes processing that are the same or similar to the processing of steps T210 to T224 in FIG. 8. Thus, the MFP 10 displays the standby screen SS2 on the display 14. Processing executed in steps T426 and T428 are the same or similar to the processing executed in steps T310 to T320 in FIG. 9. In case C, while the standby screen SS2 is displayed on the MFP 10 (i.e., prior to acceptance of user input to the OK button), an NFC connection becomes established between the MFP 10 and the mobile terminal 200 in step T428. In such a case, in step T430, the MFP 10 transmits the MAC address "M10" and the information "NG" to the mobile terminal 200 through the NFC connection (e.g., YES in step S180 in FIG. 4).

In step T430, the mobile terminal 200 receives the information "NG" from the MFP 10. Thus, the mobile terminal 200 may be notified that the MFP 10 is displaying the standby screen SS2, i.e., that the MFP 10 is in a standby status in which the MFP 10 waits for establishment of a Wi-Fi® connection with another device. In step T431, the mobile terminal 200 transmits a preferential instruction to the MFP 10 in order to establish a Wi-Fi® connection between the MFP 10 and the mobile terminal 200 preferentially.

In step T432, in response to receipt of the preferential instruction from the mobile terminal 200 (e.g., YES in step S190) in step T431, the MFP 10 ends the displaying of the standby screen SS2 (e.g., step S220). The disappearance of the standby screen SS2 thus enables the user not to perform an operation on the standby screen SS2. Therefore, the MFP 10 is allowed to establish a Wi-Fi® connection with the mobile terminal 200 successfully. Subsequent to step T432, in order to establish a Wi-Fi® connection with the mobile terminal 200, in step T434, the MFP 10 shifts to the G/O status (e.g., step S230). In step T435, the MFP 1000 generates an SSID "X10" and a password. Subsequent to step T435, the MFP 10 executes processing that are the same or similar processing to the processing executed in each of steps T326 to T340 in FIG. 9. As a result, the MFP 10 establishes a Wi-Fi® connection with the mobile terminal 200 and allows the mobile terminal 200 to participate as a CL in the WFDNW in which the MFP 10 operates as a G/O.

Figure 11:
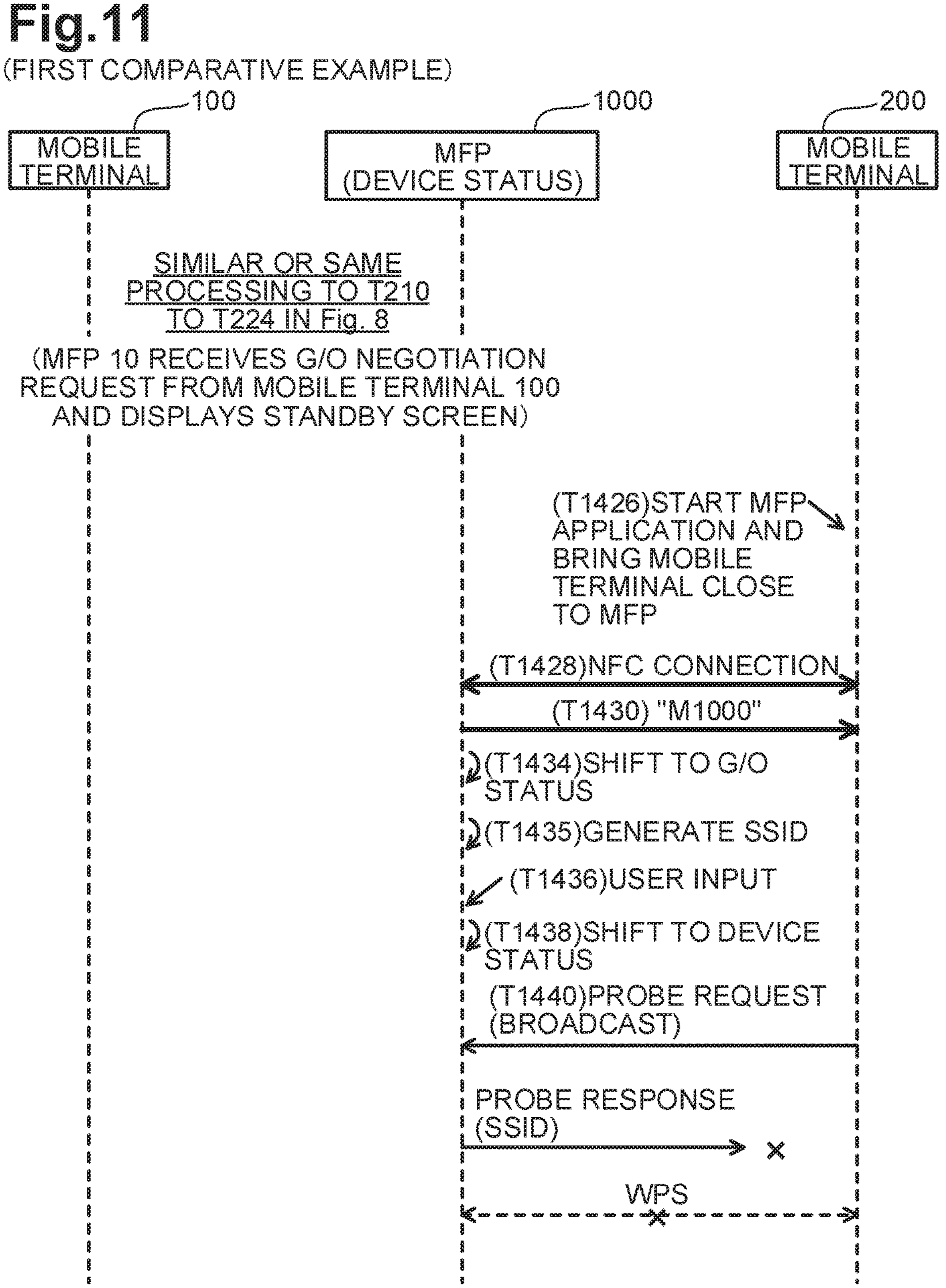
FIG. 11 is a sequence diagram representing interactions between the multifunction peripheral and the mobile terminals in a first comparative example.

First Comparative Example; FIG. 11

Hereinafter, referring to FIG. 11, a first comparative example will be described. In the first comparative example, an MFP 1000 fails in establishment of a Wi-Fi® connection with the mobile terminal 200. According to the first comparative example, if the MFP 1000 establishes an NFC connection with the mobile terminal 200 while displaying the standby screen SS2 thereon, the MFP 10 does not end the displaying of the standby screen SS2. The MFP 1000 is assigned with a MAC address "M1000" and a device name "D1000".

The MFP 1000 executes processing that are the same or similar to the processing of steps T210 to T224 in FIG. 8.

Nevertheless, a Probe response transmitted in step T214 includes the device name "D1000". In step T216, the selection screen including the device name "D1000" is displayed. Processing executed in each of steps T1426 and T1428 is the same or similar to the processing executed in each of steps T426 and T428, respectively, in FIG. 10. In step T1430, the MFP 1000 transmits the MAC address "M1000" to the mobile terminal 200 through the established NFC connection but does not transmit the information "NG" to the mobile terminal 200. Then, in steps T1434 and T1435, the MFP 1000 executes processing that are the same or similar processing to the processing executed in each of steps T434 and T435, respectively, in FIG. 10, without ending the displaying of the standby screen SS2.

After the MFP 1000 shifts to the G/O status, in step T1436, the MFP 1000 accepts input to the OK button on the standby screen SS2 by the user of the mobile terminal 100. In such a case, in step T1438, the MFP 1000 shifts from the G/O status to the device status (i.e., returns to the device status) in order to establish a Wi-Fi® connection with the mobile terminal 100. Nevertheless, because the MFP 1000 is not in the G/O status, in step T1440, if the MFP 1000 receives a Probe request from the mobile terminal 200, the MFP 1000 does not transmit a Probe response including the SSID to the mobile terminal 200. That is, the mobile terminal 200 has not received a Probe response from the MFP 100 and therefore cannot recognize the MFP 1000 having the G/O status based on the Probe response. Therefore, processing to be executed in step T330 and its subsequent steps in FIG. 9 (e.g., communication using the WPS) is not executed, and therefore, establishment of a Wi-Fi® connection fails between the MFP 1000 and the mobile terminal 200.

As opposed to the first comparative example, as illustrated in FIG. 10, in the first embodiment, where the MFP 10 establishes an NFC connection with the mobile terminal 200 while displaying the standby screen SS2 thereon (i.e., prior to acceptance of user input to the OK button), in step T432, the MFP 10 ends the displaying of the standby screen SS2. Therefore, the MFP 10 enables the user not to perform any operation on the standby screen SS2 after establishing a Wi-Fi® connection with the mobile terminal 200. Thus, the MFP 10 maintains the G/O status without shifting to the G/O status. Therefore, in response to receipt of a Probe request from the mobile terminal 200, the MFP 10 transmits a Probe response including the SSID to the mobile terminal 200 (e.g., step T328 in FIG. 9 to be executed subsequent to step T435). Thus, the MFP 10 is allowed to establish a Wi-Fi® connection with the mobile terminal 200. If the MFP 10 establishes an NFC connection with the mobile terminal 200 while displaying the standby screen SS2 thereon, it can be expected that the user of the mobile terminal 200 is closer to the MFP 10 than the user of the mobile terminal 100. In the first embodiment, therefore, the MFP 10 is allowed to successfully establish a Wi-Fi® connection with the mobile terminal 200 whose user has approached the MFP 10 prior to the user of the mobile terminal 100. As apparent from the above description, according to the first embodiment, the MFP 10 ends the displaying of the standby screen SS2 prior to establishment of a Wi-Fi® connection with the mobile terminal 200. More specifically, for example, after ending the displaying of the standby screen SS2, the MFP 10 executes connection processing for establishing a Wi-Fi® connection with the mobile terminal 200. In other cases (e.g., cases F to J) below, the same processing may be executed.

Specific Example Cases Implemented when MFP 10 is in G/O Status; FIGS. 12 to 16

Figure 12:
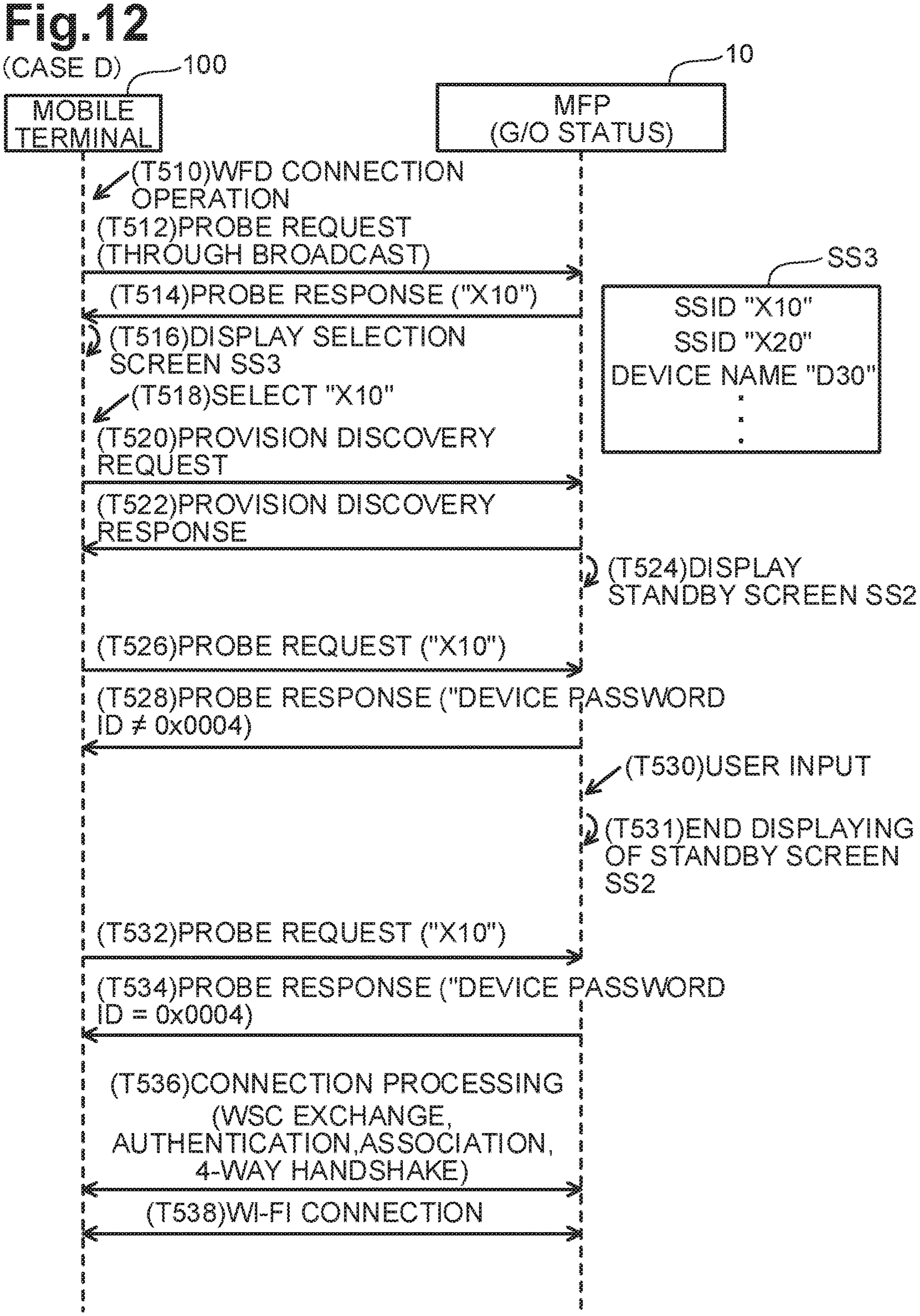
FIG. 12 is a sequence diagram representing interactions between the multifunction peripheral and the one of the mobile terminals in case D in which a user operation is performed on the standby screen when the multifunction peripheral is in the G/O status in the first embodiment according to one or more aspects of the disclosure.

Hereinafter, referring to FIGS. 12 to 16, an explanation will be provided on other specific example cases to be implemented by the processing illustrated in FIGS. 6 and 7 when the MFP 10 is in the G/O status. In each of the specific example cases, the MFP 10 has already generated an SSID "X10" and a password when shifting to the G/O status. Case D; FIG. 12

In case D, where a WFD connection operation is performed on the operation interface 112 of the mobile terminal 100, a Wi-Fi® connection becomes established between the MFP 10 having the G/O status and the mobile terminal 100. Processing executed in each of steps T510 and T512 is the same or similar to the processing executed in each of steps T210 and T212, respectively, in FIG. 8. In step T514, in response to receipt of a Probe request from the mobile terminal 100 in step T512 (e.g., YES in step S310 in FIG. 6), the MFP 10 transmits a Probe response including the MAC address "M10" and the SSID "X10" to the mobile terminal 100 (e.g., step S320).

In step T516, in response to receipt of the Probe response from the MFP 10 in step T514, the mobile terminal 100 displays a selection screen SS3 including the SSID "X10" included in the Probe response on the display 114. In step T518, the mobile terminal 100 accepts selection of the SSID "X10" on the selection screen SS3. In such a case, in step T520, the mobile terminal 100 transmits a Probe Discovery request to the MFP 10.

In step T522, in response to receipt of the Provision Discovery request from the mobile terminal 100 (e.g., YES in step S330), the MFP 10 transmits a Provision Discovery response to the mobile terminal 100 (e.g., step S340). In step T524, the MFP 10 displays the standby screen SS2 (refer to FIG. 8) (e.g., step S350).

In step T528, in response to receipt of the Probe request including the SSID "X10" as the destination in step T526 (e.g., YES in step S440), the MFP 10 transmits a Probe response to the mobile terminal 100 (e.g., step S450). At this moment, a user operation has not been performed on the standby screen SS2. Therefore, the Probe response does not includes the information "Device Password ID=0x0004". Thus, connection processing using the WPS is not executed between the mobile terminal 100 and the MFP 10.

In step T530, the MFP 10 accepts user input to the OK button on the standby screen SS2 by (e.g., YES in step S460). In step T531, the CPU 32 ends the displaying of the standby screen SS2 (e.g., step S470). In step T534, in response to receipt of the Probe request from the mobile terminal 100 in step T532 (e.g., YES in step S480), the MFP 100 transmits a Probe response including the SSID "X10" and the information "Device Password ID=0x0004" to the mobile terminal 100 (e.g., step S485). Thus, connection processing using the WPS is executed between the mobile terminal 100 and the MFP 10. Processing executed in each of steps T536 and T538 is the same or similar to the processing executed in steps T238 and T240 in FIG. 8 when the MFP 10 is in the G/O status (e.g., step S490). As a result, the MFP 10 establishes a Wi-Fi® connection with the mobile terminal 100 and allows the mobile terminal 100 to participate as a CL in the WFDNW in which the MFP 10 operates as a G/O.

Figure 13:
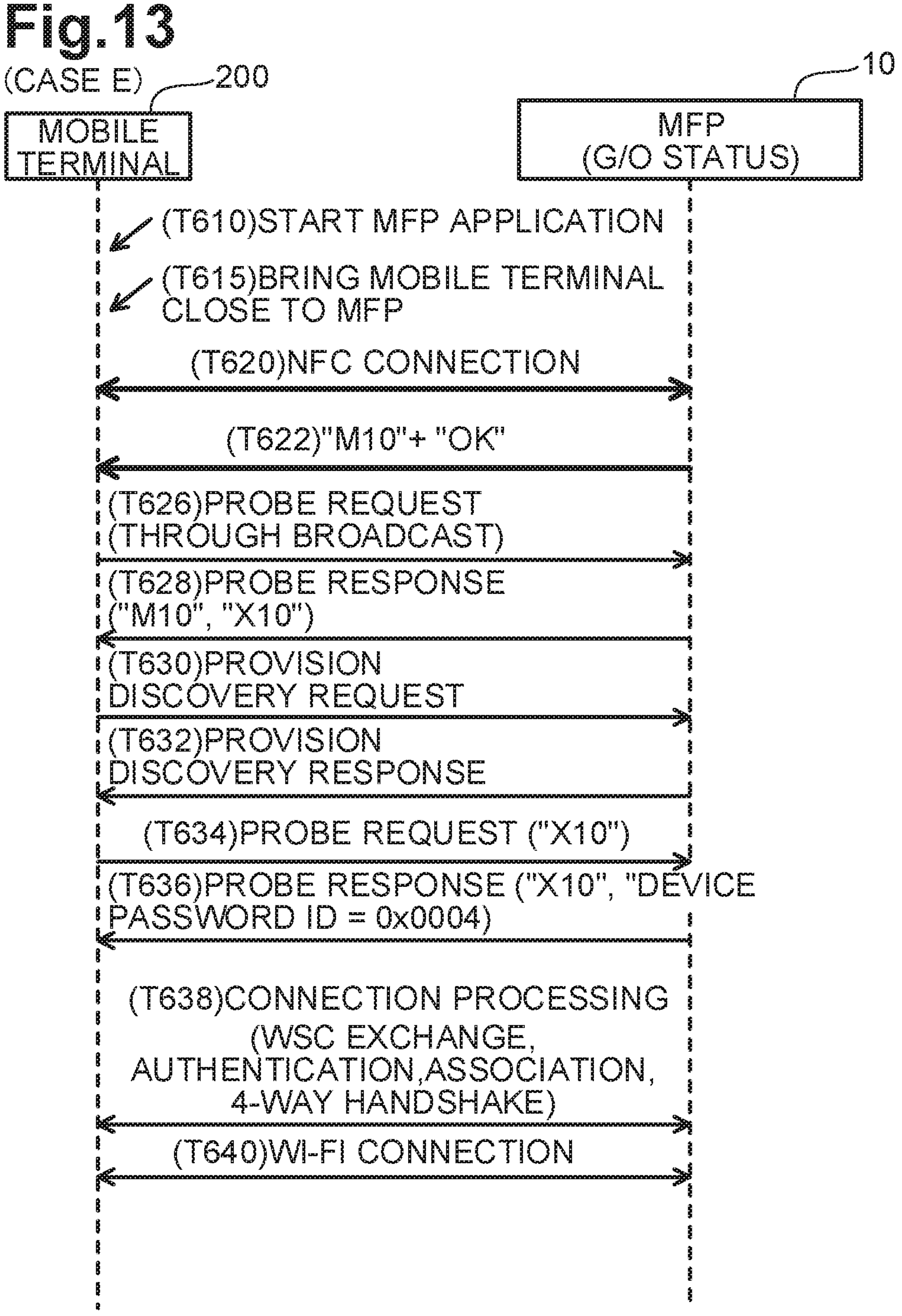
FIG. 13 is a sequence diagram representing interactions between the multifunction peripheral and the another of the mobile terminals in case E in which an NFC connection becomes established when the multifunction peripheral is in the G/O status in the first embodiment according to one or more aspects of the disclosure.

Case E; FIG. 13

In case E, establishment of a Wi-Fi® connection between the MFP 10 and the mobile terminal 200 is triggered by establishment of an NFC connection therebetween. Processing executed in case E is similar to the processing executed in case B (refer to FIG. 9). Nevertheless, in case E, the MFP 10 is in the G/O status when case E begins, which is different from case B. More specifically, for example, processing executed in steps T610 to T640 in case E do not include the processing executed in steps T324 and T325 in FIG. 9 but include all of the other processing executed in steps T310 to T340 in FIG. 9.

Figure 14:
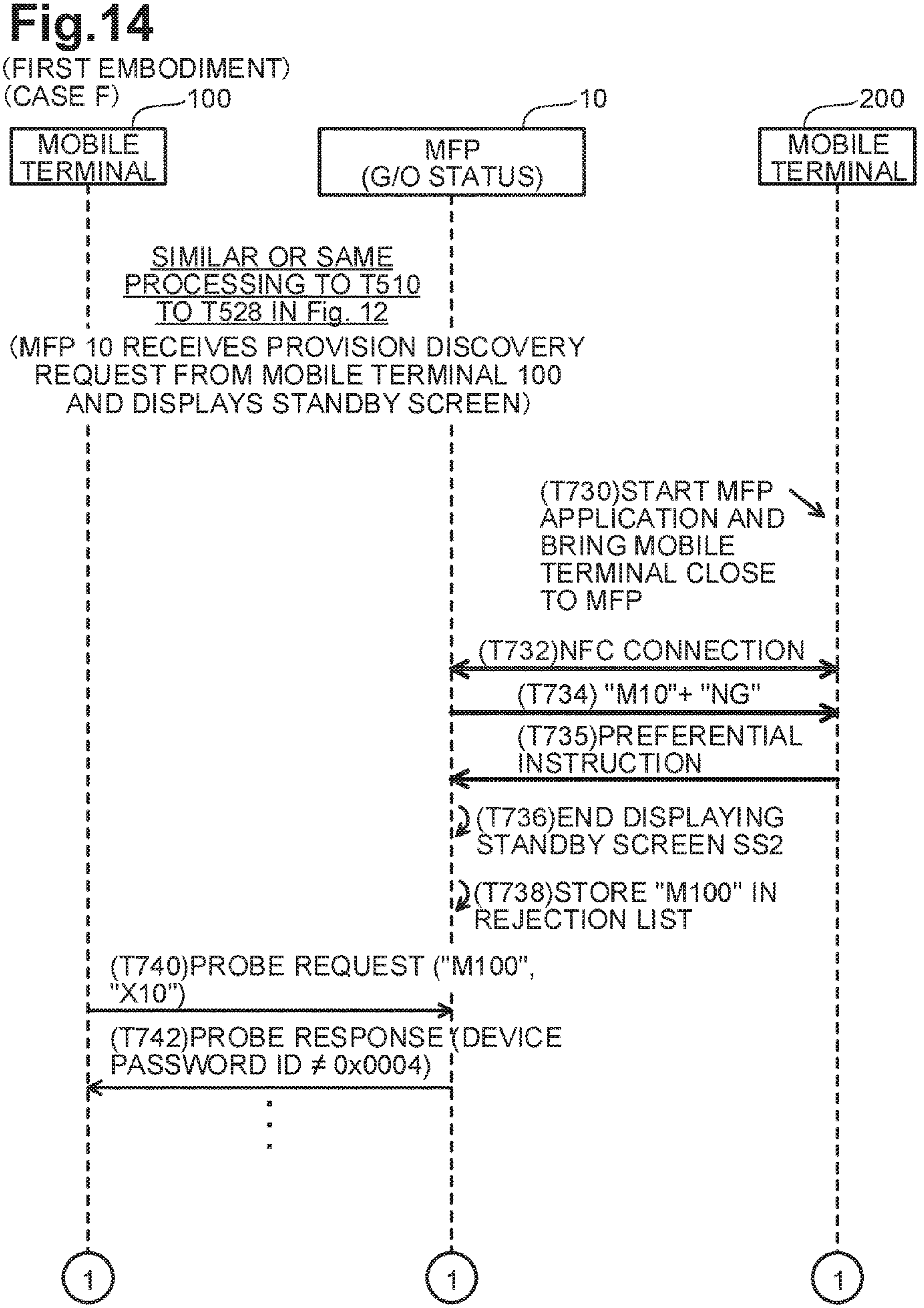
FIG. 14 is a sequence diagram representing interactions between the multifunction peripheral and the mobile terminals in case F in which an NFC connection becomes established when the multifunction peripheral is in the G/O status and the standby screen is being displayed in the first embodiment according to one or more aspects of the disclosure.
Figure 15:
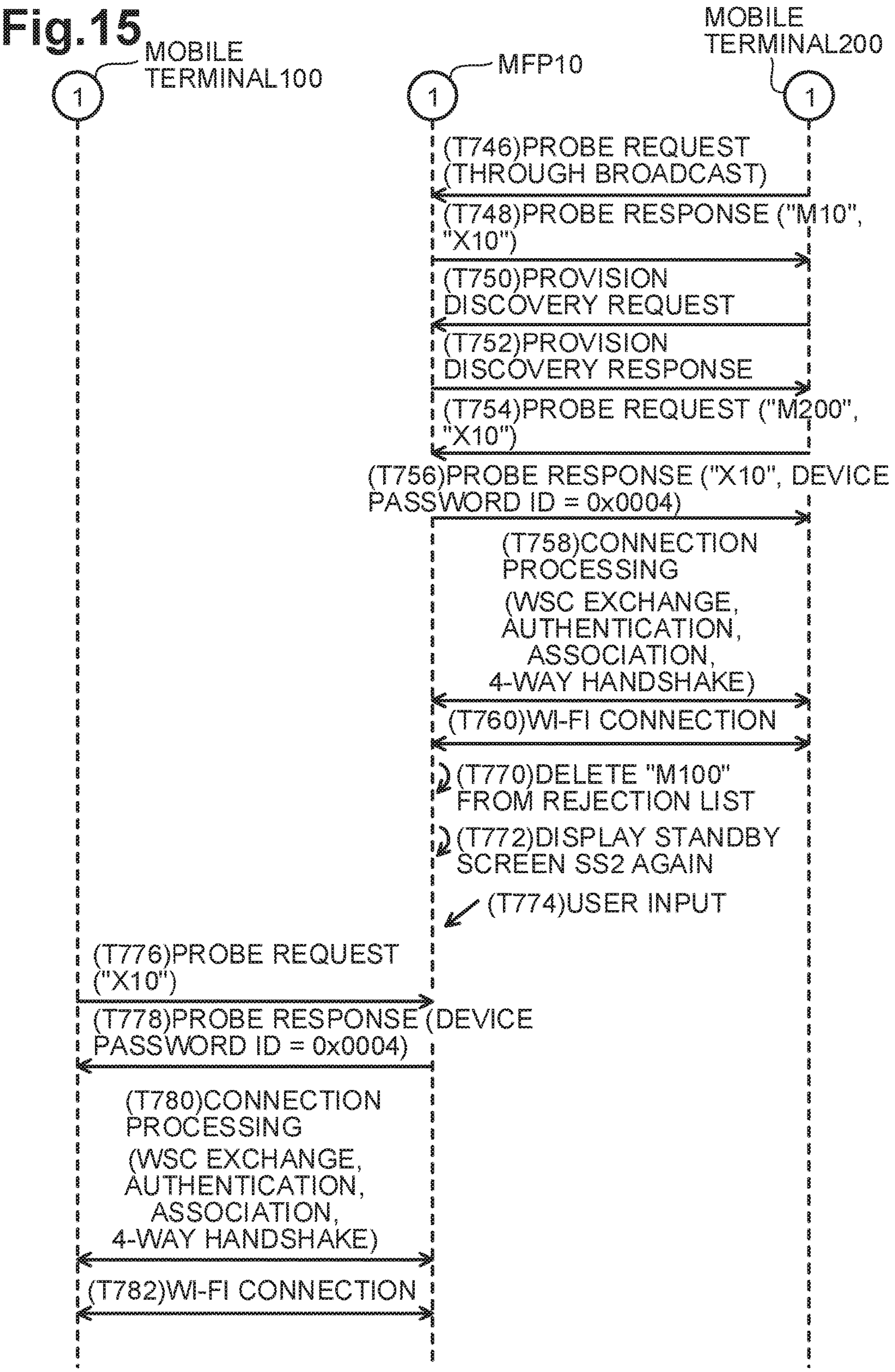
FIG. 15 is a sequence diagram continued from FIG. 12 in the first embodiment according to one or more aspects of the disclosure.

Case F; FIGS. 14 and 15

In case F, while the standby screen SS2 is displayed on the MFP 10 in case D (refer to FIG. 12), an NFC connection becomes established between the MFP 10 and the mobile terminal 200. The MFP 1000 executes processing that are the same or similar to the processing of steps T510 to T528 in FIG. 12. Thus, the MFP 10 displays the standby screen SS2 on the display 14. Processing executed in steps T730 and T732 is the same or similar to the processing executed in steps T610 to T620 in FIG. 13. In case F, while the standby screen SS2 is displayed on the MFP 10 (i.e., prior to acceptance of user input to the OK button), an NFC connection becomes established between the MFP 10 and the mobile terminal 200 in step T732. In such a case, in step T734, the MFP 10 transmits the MAC address "M10" and the information "NG" to the mobile terminal 200 through the NFC connection (e.g., YES in step S500 in FIG. 7).

Processing executed in each of steps T735 and T736 is the same or similar to the processing executed in each of steps T431 and T432, respectively, in FIG. 10. The disappearance of the standby screen SS2 thus enables the user not to perform an operation on the standby screen SS2. Therefore, the MFP 10 is allowed to establish a Wi-Fi® connection with the mobile terminal 200 successfully. In step T738, the MFP 10 stores the MAC address "M100" of the mobile terminal 100 in the rejection list 40 in the memory 34 (e.g., step S550).

In response to receipt of the Probe request including the MAC address "M100" and the SSID "X10" from the mobile terminal 100 in step T740 (e.g., YES in step S560), the MFP 10 determines that the MAC address "M100" included in the Probe request matches the MAC address "M100" included in the rejection list 40 (e.g., YES in step S570). In step T742, the MFP 100 transmits, to the mobile terminal 100, a Probe response not including the information "Device Password ID=0x0004" (e.g., step S580). Although not illustrated, if the MFP 10 again receives a Probe response from the mobile terminal 100, the MFP 10 again transmits, to the mobile terminal 100, a Probe response not including the information "Device Password ID =0x0004".

In steps T746 to T752, the MFP 10 executes processing that are the same or similar processing to the processing executed in each of steps T626 to T632 in FIG. 13. In response to receipt of the Probe request including the MAC address "M200" and the SSID "X10" from the mobile terminal 200 in step T754 (e.g., YES in step S560), the MFP 10 determines that the MAC address "M200" included in the Probe request does not match the MAC address "M100" included in the rejection list 40 (e.g., NO in step S570). In step T756, the MFP 200 transmits, to the mobile terminal 200, a Probe response including the information "Device Password ID=0x0004" (e.g., step S590). Then, in steps T758 and T760, the MFP 10 executes processing that are the same or similar processing to the processing executed in each of steps T638 and T640 in FIG. 13 (e.g., step S600). As a result, the MFP 10 establishes a Wi-Fi® connection with the mobile terminal 200 and allows the mobile terminal 200 to participate as a CL in the WFDNW in which the MFP 10 operates as a G/O.

In step T770, the MFP10 deletes the MAC address "M100" of the mobile terminal 100 from the rejection list 40 (e.g., step S610). In step T772, the MFP 10 displays the standby screen SS2 on the display 14 again (e.g., step S620). In response to acceptance of input to the OK button on the standby screen SS2 by the user of the mobile terminal 100 in step T774 (e.g., YES in step S460), in steps T776 to T782, the MFP 10 executes processing that are the same or similar processing to the processing executed in each of steps T532 to T538 in FIG. 12 (e.g., steps S470 to S490). As a result, the MFP 10 establishes a Wi-Fi® connection with the mobile terminal 100 and allows the mobile terminal 100 to participate as a CL in the WFDNW in which the MFP 10 operates as a G/O. That is, the MFP 10 is allowed to establish a Wi-Fi® connection with each of the first and third mobile terminals at different timings. More specifically, the MFP 10 is allowed to establish a Wi-Fi® connection selectively with an appropriate one of the first and third mobile terminals at an appropriate timing.

Figure 16:
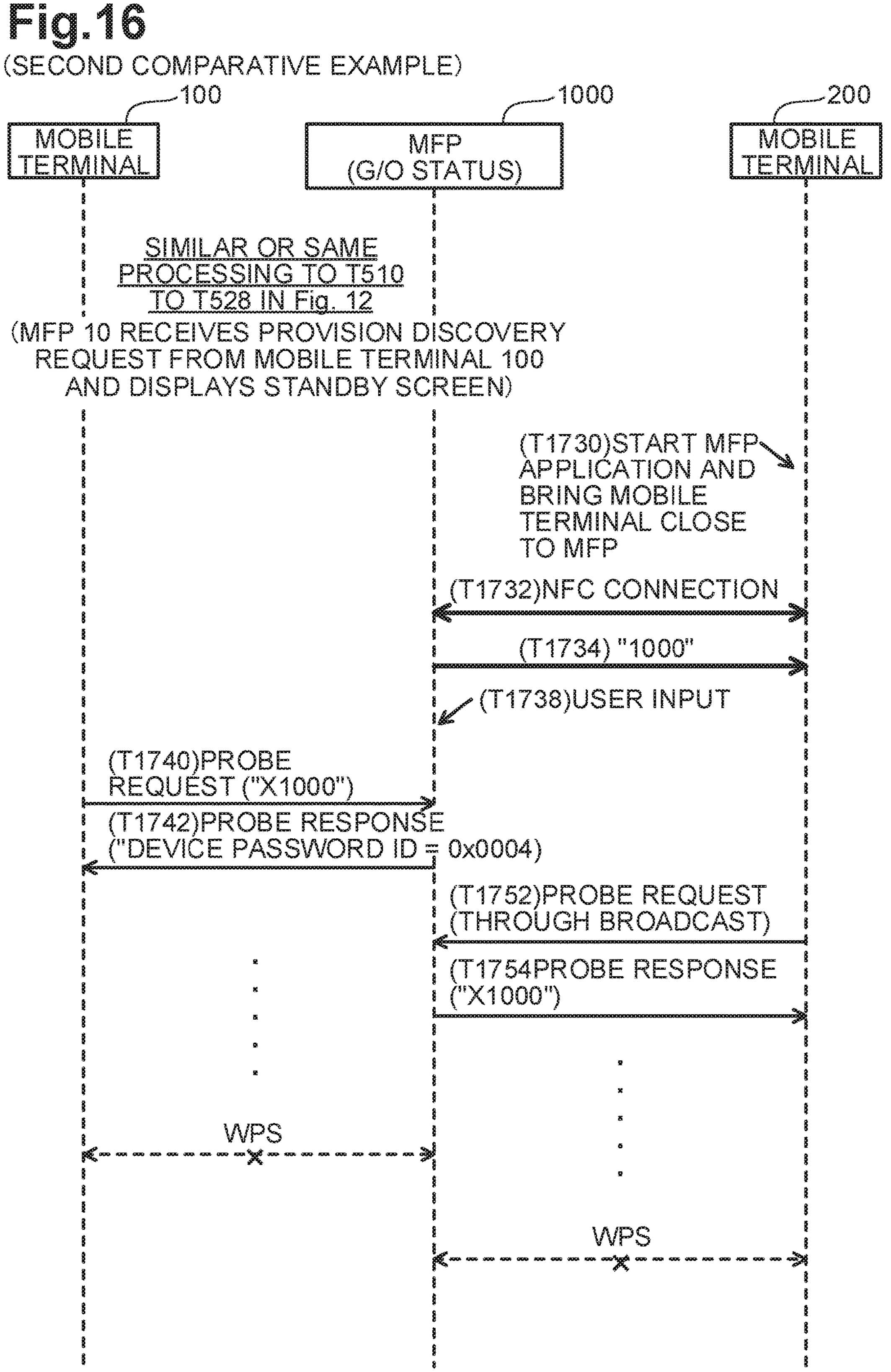
FIG. 16 is a sequence diagram representing interactions between the multifunction peripheral and the mobile terminals in a second comparative example in the first embodiment according to one or more aspects of the disclosure.

Second Comparative Example; FIG. 16

Hereinafter, referring to FIG. 16, a second comparative example will be described. In the second comparative example, the MFP 1000 fails in establishment of a Wi-Fi® connection with the mobile terminal 200. Similar to the first comparative example, according to the second comparative example, if the MFP 1000 establishes an NFC connection with the mobile terminal 200 while displaying the standby screen SS2 thereon, the MFP 10 does not end the displaying of the standby screen SS2. The MFP 1000 has already generated the SSID "X1000" to be used in the WFDNW in which the MFP 1000 operates as a G/O.

The MFP 1000 executes processing that are the same or similar to the processing of steps T510 to T528 in FIG. 12. Nevertheless, a Probe response transmitted in step T514 (refer to FIG. 12) includes the SSID "X1000". In step T516, the selection screen including the SSID "X1000" is displayed. Processing executed in each of steps T1730 and T1732 is the same or similar to the processing executed in each of steps T730 and T732, respectively, in FIG. 14. In step T1734, the MFP 1000 transmits the MAC address "M1000" to the mobile terminal 200 through the established NFC connection but does not transmit the information "NG" to the mobile terminal 200. In step T1738, the MFP 10 accepts input to the OK button on the standby screen SS2 by the user of the mobile terminal 100. In such a case, in step T1742, in response to receipt of the Probe request including the MAC address "M1000" and the SSID "X1000" from the mobile terminal 100 in step T1740, the MFP 100 transmits a Probe response including the information "Device Password ID=0x0004" to the mobile terminal 100. Thus, the MFP 1000 attempts to execute processing that are the same or similar to the processing executed in each of steps T536 and T538 in FIG. 12 in order to establish a Wi-Fi® connection with the mobile terminal 100.

In step T1754, in response to receipt of the Probe request from the mobile terminal 200 in step T1752, the MFP 10 transmits a Probe response including the SSID "X1000" to the mobile terminal 200. In such a case, the MFP 1000 attempts to execute processing that are the same or similar to the processing executed in each of steps T630 to T640 in FIG. 13 in order to establish a Wi-Fi® connection with the mobile terminal 200.

Nevertheless, according to the Wi-Fi Alliance standards, if the MFP 1000 attempts to execute connection processing for establishing a connection with a device concurrently with another connection processing for establishing another connection with another device (i.e., attempts to establish connections with two or more devices concurrently), all of the attempted connection processing (i.e., communication using the WPS) are cancelled. Thus, in the MFP 1000, the connection processing for establishing a Wi-Fi® connection with the mobile terminal 100 and the connection processing for establishing a Wi-Fi® connection with the mobile terminal 200 are both cancelled. That is, the MFP 1000 is not allowed to establish a Wi-Fi® connection with either of the mobile terminals 100 and 200. If one of the processing executed in step T1740 and its subsequent steps (e.g., the communication with the mobile terminal 100) and the processing executed in step T1752 and its subsequent steps (e.g., the communication with the mobile terminal 200) is started prior to the other, if the other is started prior to the one, or if both are started at the same timing, both of the connection processing are cancelled according to the Wi-Fi Alliance standards.

As opposed to the second comparative example, as illustrated in FIG. 14, in the first embodiment, where the MFP 10 establishes an NFC connection with the mobile terminal 200 while displaying the standby screen SS2 thereon (i.e., prior to acceptance of user input to the OK button), in step T736, the MFP 10 ends the displaying of the standby screen SS2. Therefore, the MFP 10 enables the user not to perform an operation on the standby screen SS2 after establishing a Wi-Fi® connection with the mobile terminal 200. Thus, connection processing is not executed between the MFP 10 and the mobile terminal 100. Therefore, the MFP 10 does not execute the connection processing for establishing a connecting with the mobile terminal 100 during execution of the connection processing for establishing a connecting with the mobile terminal 200. That is, the connection processing for establishing a connecting with the mobile terminal 200 is not cancelled. Consequently, the MFP 10 is allowed to establish a Wi-Fi® connection with the mobile terminal 200 successfully. In particular, the MFP 10 is allowed to successfully establish a Wi-Fi® connection with the mobile terminal 200 whose user has approached the MFP 10 prior to the user of the mobile terminal 100.

The MFP 10 is an example of a "communication device". The mobile terminal 100 is an example of a "first external device". The mobile terminal 200 is an example of a "second external device". The NFC I/F 22 is an example of a "first wireless interface". The Wi-Fi® I/F 20 is an example of a "second wireless interface". Each of the G/O negotiation request and the Provision Discovery request is an example of a "connection request". The G/O negotiation request is an example of a "first-type connection request". The Provision Discovery request is an example of a "second-type connection request". The Wi-Fi® connection established between the MFP 10 and the mobile terminal 100 is an example of a "second wireless interface connection". The NFC connection established between the MFP 10 and the mobile terminal 200 is an example of a "connection via the first wireless interface". The Wi-Fi® connection established between the MFP 10 and the mobile terminal 200 is an example of a "connection with the second external device". The preferential instruction is an example of a "predetermined instruction". The device status is an example of a "specific status". The communication executed in step S490 in FIG. 7 is an example of "communication for establishing the second wireless interface connection with the first external device via the second wireless interface". The information "Device Password ID=0x0004" is an example of "information for starting communication for establishing the second wireless interface connection with the first external device". The rejection list 40 is an example of a "predetermined list". The Probe request received in step S480 is an example of a "request signal". The Probe response transmitted in step S485 is an example of a "response signal". The Probe request received from the first mobile terminal in step S560 is another example of the "request signal". The Probe request received from the third mobile terminal in step S560 is an example of a "request signal". The Probe response transmitted in step S590 is an example of a "response signal". The interfaces may be hardware including an antenna and a CPU, such as the Wi-Fi® I/F 20 and the NFC I/F 22.

Second Embodiment

Although being an NFC tag in the first embodiment, the NFC I/F 22 of the MFP 10 may be an NFC forum device in the second embodiment. In an initial state that is a state prior to establishment of an NFC connection between the NFC I/F 22 of the MFP 10 and an NFC I/F (e.g., the NFC I/F 22) of a mobile terminal, the NFC I/F 22 of the MFP 10 operates in the Reader/Writer mode (hereinafter, referred to as the "R/W mode") and the NFC I/F of the mobile terminal operates in the CE mode.

Processing to be executed by MFP 10; FIGS. 3, 4, 6, and 7

In the initial state (refer to FIGS. 3 and 6), the CPU 32 does not provide the MAC address "M10" and the information "OK" to the NFC I/F 22. Further, the processing of step S60 in FIG. 3 and the processing of step S360 in FIG. 6 are not executed. If, in step S80 (refer to FIG. 3), the CPU 32 determines that an NFC connection has been established, the NFC I/F 22 does not transmit the MAC address "M10" and the information "OK" to the second mobile terminal. The NFC I/F 122 operates in the Reader mode and reads (i.e., receives) necessary information from the second mobile terminal.

If, in step S80, the CPU 32 determines that an NFC connection has been established (e.g., YES in step S110), in step S100, the CPU 32 causes the NFC I/F 22 to shift to the P2P mode. In step S110, the CPU 32 provides the MAC address "M10" to the NFC I/F 22. Thus, the NFC I/F 22 operates in the P2P mode and transmits the MAC address "M10" to the second mobile terminal. Thereafter, the routine proceeds to step S120.

Processing executed in each of steps S180 to and S210 in FIG. 4 is the same or similar to the processing executed in each of steps S80 and S110, respectively, in FIG. 3. Processing executed in each of steps S380 to S410 in FIG. 6 is also the same or similar to the processing executed in each of steps S80 and S110, respectively, in FIG. 3. If the CPU 32 makes a positive determination in step S500 (refer to FIG. 7) (e.g., YES in step S500), the CPU 32 executes the processing of step S220 via steps S190 to S210 (refer to FIG. 4).

Figure 17:
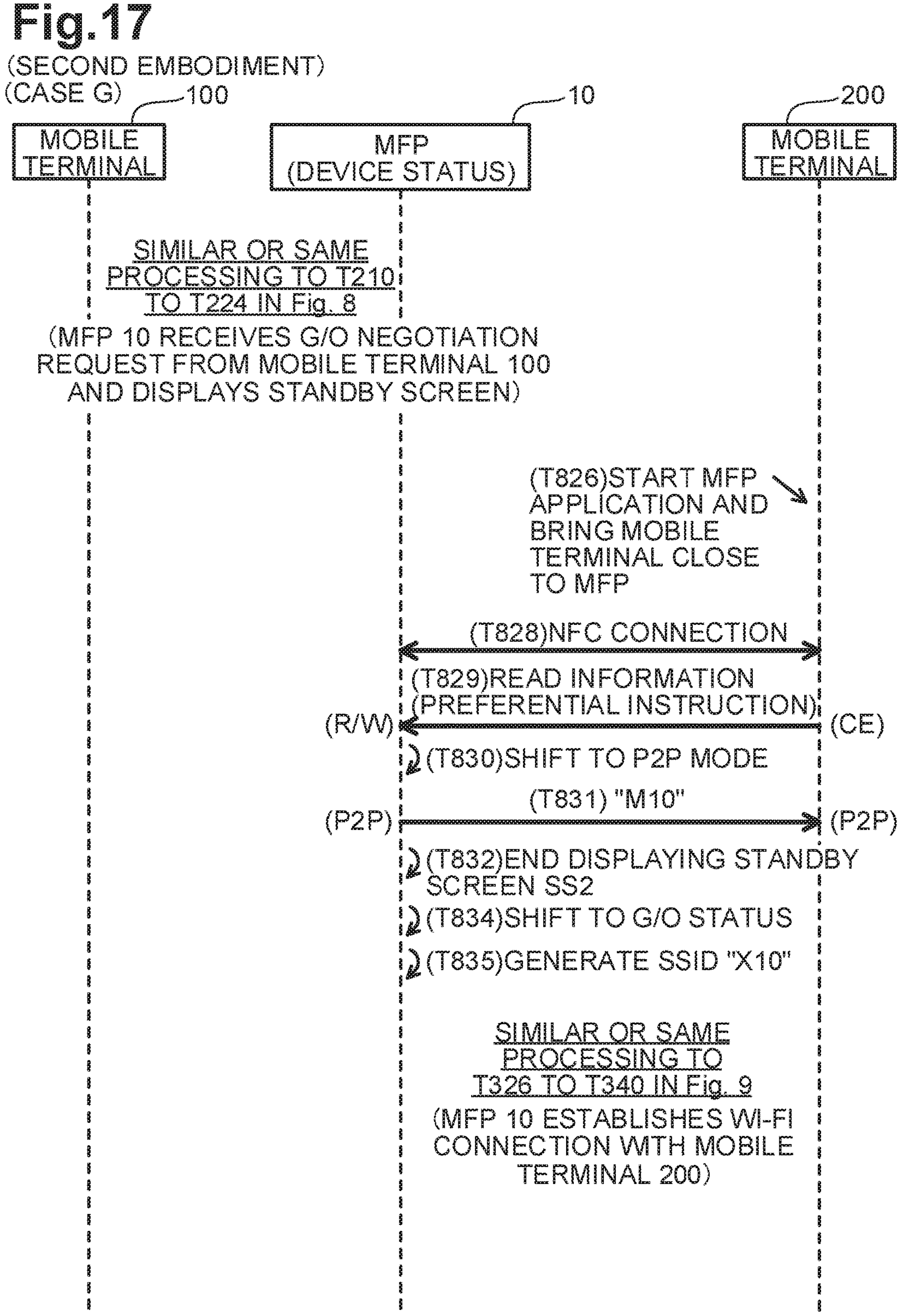
FIG. 17 is a sequence diagram representing interactions between the multifunction peripheral and the mobile terminals in case G in which an NFC connection becomes established when the multifunction peripheral is in the device status and the standby screen is being displayed in the second embodiment according to one or more aspects of the disclosure.

Case G: Specific Example Implemented when MFP 10 is in Device Status; FIG. 17

Hereinafter, referring to FIG. 17, an explanation will be provided on a specific example case to be implemented by processing illustrated in FIGS. 3 and 4 when the MFP 10 is in the device status.

The MFP 10 executes processing that are the same or similar to the processing of steps T210 to T224 in FIG. 8. Thus, the MFP 10 displays the standby screen SS2 on the display 14. Processing executed in each of steps T826 and T828 is the same or similar to the processing executed in each of steps T426 and T428, respectively, in FIG. 10. In step T829, while the NFC I/F 22 operates in the Reader mode, the MFP 10 reads (i.e., receives), from the mobile terminal 200, Read information including a preferential instruction. In step T830, the MFP 10 causes the NFC I/F 22 to shift to the P2P mode. In step T831, while the NFC I/F 22 operates in the P2P mode, the MFP 10 transmits the MAC address "M10" to the mobile terminal 200. Processing executed in each of steps T832 to T835 is the same or similar to the processing executed in each of steps T432 to T435, respectively, in FIG. 10. Subsequent to step T835, the MFP 10 executes processing that are the same or similar processing to the processing executed in each of steps T326 to T340 in FIG. 9. As a result, the MFP 10 establishes a Wi-Fi® connection with the mobile terminal 200 and allows the mobile terminal 200 to participate as a CL in the WFDNW in which the MFP 10 operates as a G/O.

Case H: Specific Example Implemented When MFP 10 Is In G/O Status; FIG. 18

Hereinafter, referring to FIG. 18, an explanation will be provided on a specific example case to be implemented by processing illustrated in FIGS. 6 and 7 when the MFP 10 is in the G/O status.

The MFP 10 executes processing that are the same or similar to the processing of steps T510 to T528 in FIG. 12. Thus, the MFP 10 displays the standby screen SS2 on the display 14. Processing executed in each of steps T930 to T938 is the same or similar to the processing executed in each of steps T826 to T832, respectively, in FIG. 17. Processing executed in step T939 is the same or similar to the processing executed in step T738 in FIG. 14. Subsequent to step T738, the MFP 10 executes processing that are the same or similar processing to the processing executed in each of steps T740 to T782 in FIGS. 14 and 15.

According to the second embodiment, the NFC I/F 22 of the MFP 10 operates in the R/W mode in the initial state. Therefore, the NFC I/F 22 operates in the Reader mode and is enabled to read necessary information from, for example, an authentication card. In such a case, if authentication of the authentication card succeeds, the MFP 10 is allowed to perform, for example, printing. The NFC I/F 22 is also enabled to read Read information from the mobile terminal 200 (e.g., step T829 in FIG. 17 or step T935 in FIG. 18). If the Read information includes a preferential instruction, the NFC I/F 22 shifts to the P2P mode (e.g., step T830 in FIG. 17 or step T936 in FIG. 18) and the MFP 10 transmits the MAC address "M10" to the mobile terminal 200 (e.g., step T831 in FIG. 17 or step T937 in FIG. 18). Thus, the MFP 10 is allowed to establish a Wi-Fi® connection with the mobile terminal 200 successfully.

For example, in a comparative example, it is assumed that after the NFC I/F 22 reads Read information including a preferential instruction from the mobile terminal 200, the NFC I/F 22 operates in one of the Writer mode and the CE mode but not shift to the P2P mode, and transmits the MAC address "M10" to the mobile terminal 200. According to such a comparative example, after the NFC I/F 22 transmits the MAC address "M10" to the mobile terminal 200, the NFC I/F 22 does not receive, from the mobile terminal 200, the information indicating that the mobile terminal 200 has received the information (e.g., the MAC address) successfully. This is because the Writer mode and the CE mode are both a mode for executing unidirectional communication but not bidirectional communication. Therefore, in the comparative example, the NFC I/F 22 is not enabled to determine whether the mobile terminal 200 has received the information successfully. As opposed to the comparative example, according to the second embodiment, after the NFC I/F 22 reads Read information including a preferential instruction from the mobile terminal 200, the NFC I/F 22 operates in the P2P mode for executing bidirectional communication and transmits the MAC address "M10" to the mobile terminal 200. This configuration may therefore enable the NFC I/F 22 to receive, from the mobile terminal 200, the information indicating that the mobile terminal 200 has received the information successfully, and determine whether the mobile terminal 200 has received the information successfully. If the NFC I/F 22 determines that the mobile terminal 200 has not received the information, the NFC I/F 22 may transmit the MAC address "M10" again. Thus, the NFC I/F 22 is enabled to transmit the MAC address "M10" to the mobile terminal 200 certainly. In variations or modifications, the configuration according to such a comparative example may be adopted. For example, in one variation, when receiving a preferential instruction from the mobile terminal 200, the NFC I/F 22 may operate in one of the P2P mode and the CE mode. When transmitting the MAC address "M10" to the mobile terminal 200, the NFC I/F 22 may operate in one of the P2P mode, the CE mode, and the Writer mode.

Third Embodiment

In a third embodiment, where an NFC connection becomes established between the MFP 10 and the third mobile terminal first time while the standby screen is displayed on the MFP 10 (i.e., prior to acceptance of user input to the OK button) (e.g., YES in step S180 in FIG. 4, or YES in step S500 in FIG. 7), the CPU 32 does not receive a preferential instruction from the third mobile terminal (e.g., NO in step S190). Where an NFC connection becomes established between the MFP 10 and the third mobile terminal second time while the standby screen is displayed on the MFP 10 (e.g., YES in step S180 or YES in step S500), the CPU 32 receives a preferential instruction from the third mobile terminal (e.g., YES in step S190). More specifically, for example, where the third mobile terminal establishes an NFC connection with the MFP 10 first time while the MFP application 138 is running, the third mobile terminal does not transmit a preferential instruction to the MFP 10 and stores, in its memory (not illustrated), the MAC address "M10" of the MFP 10 received through the NFC connection. Where the third mobile terminal then establishes an NFC connection with the MFP 10 second time, in response to determination that the MAC address received through the NFC connection matches the MAC address stored in the memory, the third mobile terminal transmits a preferential instruction to the MFP 10. That is, if the third mobile terminal determines that the third mobile terminal established the first NFC connection and the second NFC connection with the same device, the third mobile terminal transmits a preferential instruction to the target device. In the third embodiment, the NFC I/F 22 of the MFP 10 may be an NFC tag, which is the same as the first embodiment. Nevertheless, in other embodiments, for example, the NFC I/F 22 may be an NFC forum device like the second embodiment.

Figure 19:
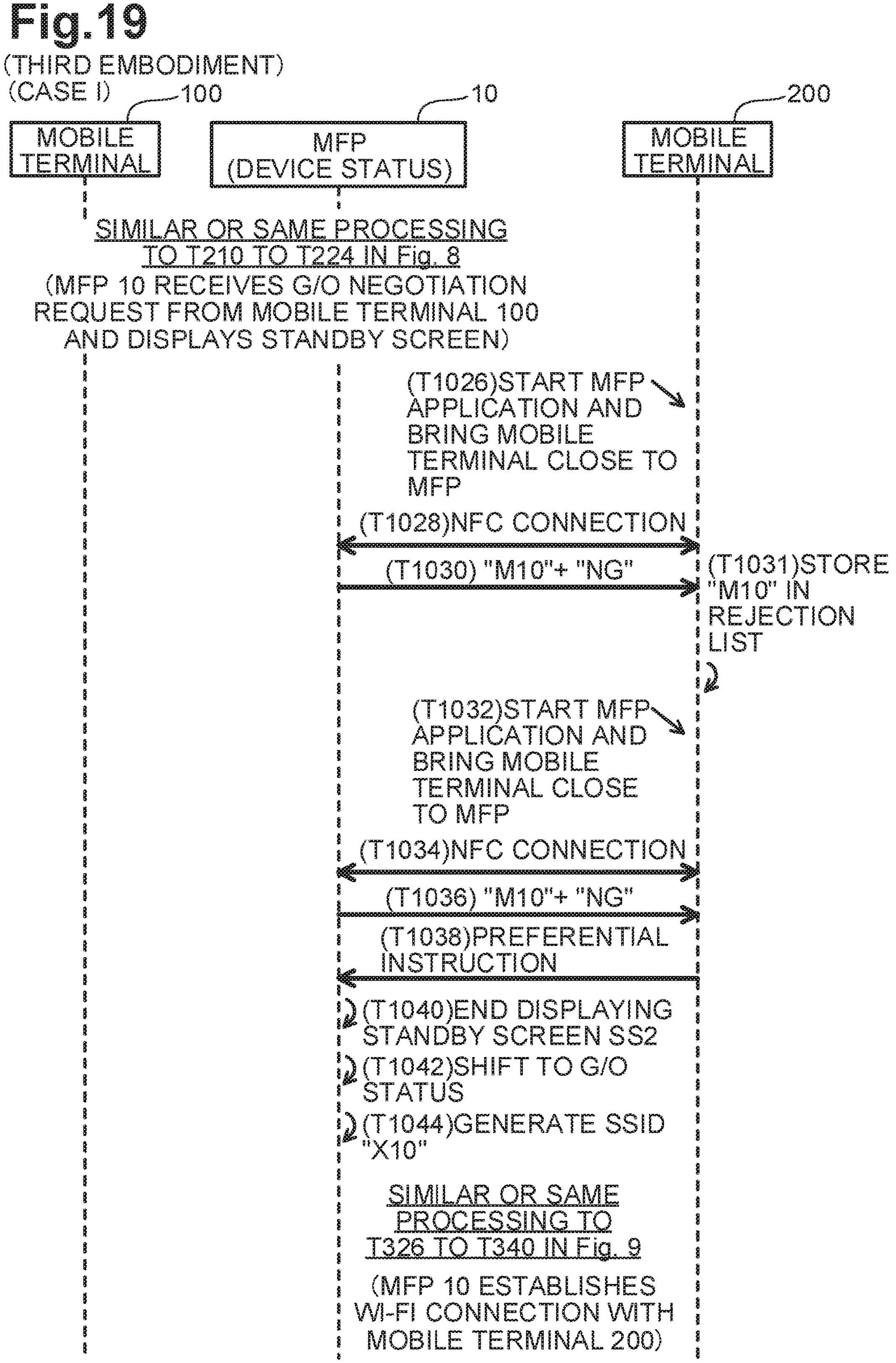
FIG. 19 is a sequence diagram representing interactions between the multifunction peripheral and the mobile terminals in case I in which an NFC connection becomes established when the multifunction peripheral is in the device status and the standby screen is being displayed in a third embodiment according to one or more aspects of the disclosure.

Case I: Specific Example Implemented when MFP 10 is in Device Status; FIG. 19

Hereinafter, referring to FIG. 19, an explanation will be provided on a specific example case to be implemented by processing illustrated in FIGS. 3 and 4 when the MFP 10 is in the device status.

The MFP 10 executes processing that are the same or similar to the processing of steps T210 to T224 in FIG. 8. Thus, the MFP 10 displays the standby screen SS2 on the display 14. Processing executed in each of steps T1026 to T1030 is the same or similar to the processing executed in each of steps T426 to T430, respectively, in FIG. 10. In response to receipt of the information "NG" from the MFP 10 (e.g., step T1030) after the mobile terminal 200 establishes an NFC connection with the MFP 10 first time (e.g., step T1028), the mobile terminal 200 does not transmit a preferential instruction to the MFP 10. In response to receipt of the information "NG" from the MFP 10, the mobile terminal 200 displays a predetermined message. In step T1031, the mobile terminal 200 stores the MAC address "M10" in the memory of the mobile terminal (not illustrated). The predetermined message may include a letter/character string indicating that the standby screen SS2 is being displayed for accepting input by a user of another mobile terminal, and another letter/character string indicating that if the user desires to establish a Wi-Fi® connection between the MFP 10 and the mobile terminal 200 preferentially, the user needs to bring the mobile terminal 200 close to the MFP 10 again. In step T1032, in response to the predetermined message, the user brings the mobile terminal 200 close to the MFP 10 again. In response to receipt of the information "NG" from the MFP 10 (e.g., step T1036) after the mobile terminal 200 establishes an NFC connection with the MFP 10 second time (e.g., step T1034), the mobile terminal 200 determines that the received MAC address "M10" matches the MAC address "M10" stored in the memory. In step T1038, in response to determination that the received MAC address "M10" matches the MAC address "M10" stored in the memory, the mobile terminal 200 transmits a preferential instruction to the MFP 10.

Processing executed in each of steps T1040 to T1044 is the same or similar to the processing executed in each of steps T432 to T435, respectively, in FIG. 10. Subsequent to step T1044, the MFP 10 executes processing that are the same or similar processing to the processing executed in each of steps T326 to T340 in FIG. 9. As a result, the MFP 10 establishes a Wi-Fi® connection with the mobile terminal 200 and allows the mobile terminal 200 to participate as a CL in the WFDNW in which the MFP 10 operates as a G/O.

The MAC address "M10" of the MFP 10 stored in the memory of the mobile terminal 200 in step T1031 in response to establishment of the first NFC connection with the MFP 10 is deleted, for example, if a predetermined time has elapsed or if, in step T1038, the mobile terminal 200 transmits a preferential instruction to the MFP 10.

Figure 20:
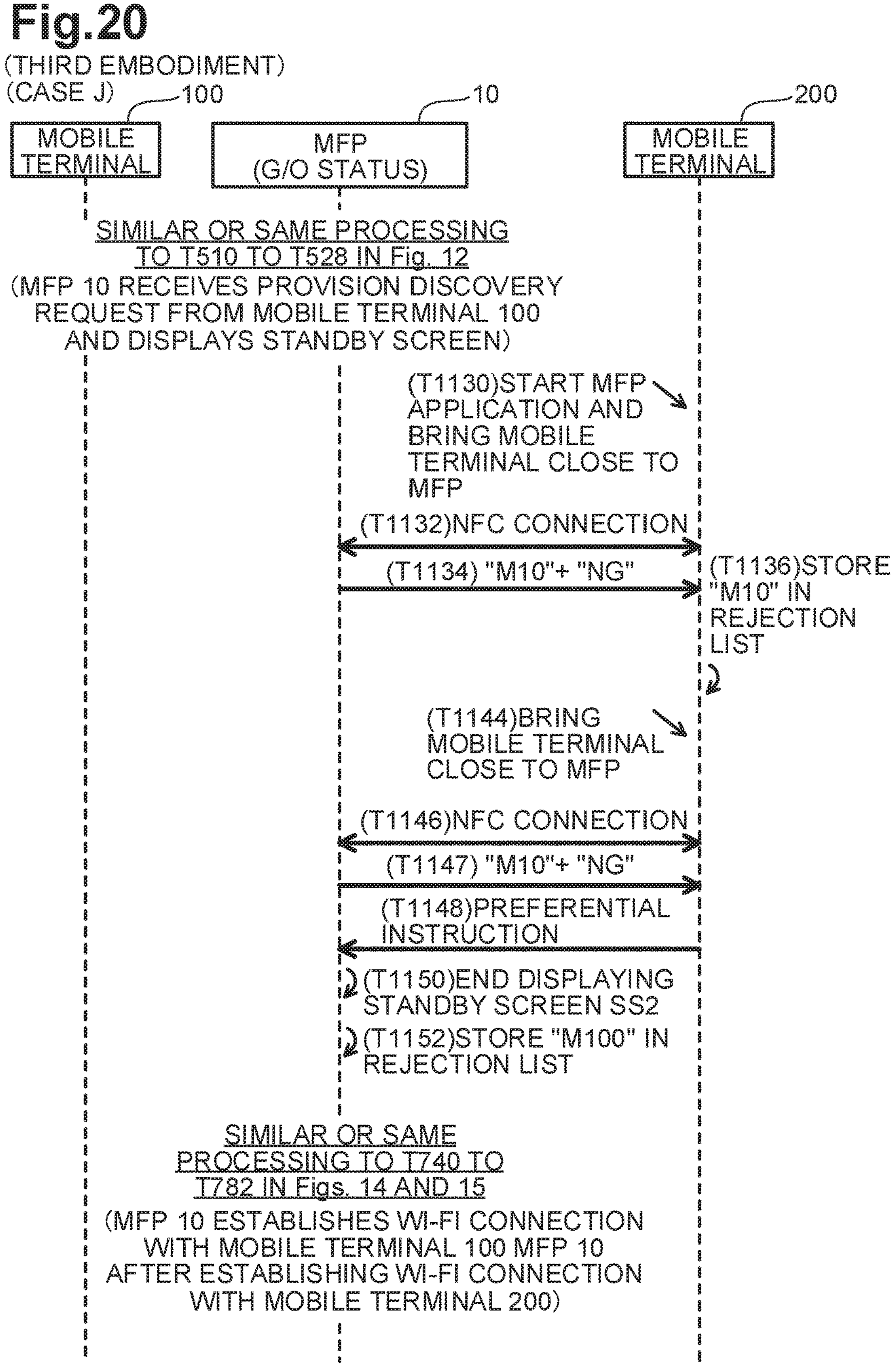
FIG. 20 is a sequence diagram representing interactions between the multifunction peripheral and the mobile terminals in case J in which an NFC connection becomes established when the multifunction peripheral is in the G/O status and the standby screen is being displayed in the third embodiment according to one or more aspects of the disclosure.

Case J: Specific Example Implemented when MFP 10 is in G/O Status; FIG. 20

Hereinafter, referring to FIG. 20, an explanation will be provided on a specific example case to be implemented by processing illustrated in FIGS. 6 and 7 when the MFP 10 is in the G/O status.

The MFP 10 executes processing that are the same or similar to the processing of steps T510 to T528 in FIG. 12. Thus, the MFP 10 displays the standby screen SS2 on the display 14. Processing executed in each of steps T1130 to T1134 is the same or similar to the processing executed in each of steps T730 to T734, respectively, in FIG. 14. In case I, also, where the mobile terminal 200 receives the information "NG" from the MFP 10 (e.g., step T1134) after establishing an NFC connection with the MFP 10 first time (e.g., steps T1132 and T1134), the mobile terminal 200 does not transmit a preferential instruction to the MFP 10 and displays the predetermined message. Then, in step T1136, the mobile terminal 200 stores the MAC address "M10" in the memory of the mobile terminal 200. In step T1144, the user brings the mobile terminal 200 close to the MFP 10 again. In response to receipt of the information "NG" from the MFP 10 (e.g., step T1148) after the mobile terminal 200 establishes an NFC connection with the MFP 10 second time (e.g., step T1146), the mobile terminal 200 determines that the received MAC address "M10" matches the MAC address "M10" stored in the memory. In step T1150, in response to determination that the received MAC address "M10" matches the MAC address "M10" stored in the memory, the mobile terminal 200 transmits a preferential instruction to the MFP 10. Processing executed in each of steps T1150 and T1152 is the same or similar to the processing executed in each of steps T736 and T738, respectively, in FIG. 14. Subsequent to step T738, the MFP 10 executes processing that are the same or similar processing to the processing executed in each of steps T740 to T782 in FIGS. 14 and 15.

According to the third embodiment, as illustrated in FIGS. 19 and 20, when the MFP 100 establishes an NFC connection with the mobile terminal 200 first time while displaying the standby screen SS2 thereon, the MFP 10 does not execute connection processing for establishing a connection with the mobile terminal 200. Thus, the mobile terminal 200 displays the predetermined message thereon. Therefore, the user of the mobile terminal 200 may be notified that the standby screen SS2 is displaying, thereby determining whether a higher priority should be given to establishment of a connection between the mobile terminal 200 and the MFP 10 than establishment of a connection between the mobile terminal 100 and the MFP 10. If the user determines that a higher priority should be given to establishment of a connection between the mobile terminal 200 and the MFP 10 than establishment of a connection between the mobile terminal 100 and the MFP 10, the user brings the mobile terminal 200 close to the MFP 10. Thus, a Wi-Fi® connection is established between the mobile terminal 200 and the MFP 10. If the user determines that the mobile terminal 200 does not need to establish a connection with the MFP 10, the user does not bring the mobile terminal 200 close to the MFP 10. Thus, in response to acceptance of input to the standby screen SS2 by the user of the mobile terminal 100, a Wi-Fi® connection is established between the mobile terminal 100 and the MFP 10. According to the third embodiment, if the MFP 10 establishes an NFC connection with the mobile terminal 200 while displaying the standby screen SS2 thereon, the user of the mobile terminal 200 may determine whether the mobile terminal 200 is to be connected to the MFP 10.

Fourth Embodiment

In a fourth embodiment, where an NFC connection becomes established between the MFP 10 and the third mobile terminal while the standby screen is displayed on the MFP 10 (i.e., while the MFP 10 is waiting for starting of connection processing for establishing a Wi-Fi® connection with the first mobile terminal) (e.g., YES in step S180 in FIG. 4, or YES in step S190 in FIG. 7), the MFP 10 does not end the displaying of the standby screen. In the fourth illustrative embodiment, the NFC I/F 22 of the MFP 10 may be an NFC tag, which is the same as the first embodiment. Nevertheless, in other embodiments, for example, the NFC I/F 22 may be an NFC forum device like the second embodiment.

Processing to be executed by MFP 10; FIGS. 3, 4, 6, and 7

As illustrated in FIG. 4, in step S220, in response to receipt of a preferential instruction from the third mobile terminal (e.g., YES in step S190), the CPU 32 stores a prohibition flag with a value "ON" in the memory 43 without ending the displaying of the standby screen. The value of "ON" indicates that the MFP 10 is prohibited from executing connection processing for establishing a Wi-Fi® connection with the first mobile terminal. More specifically, for example, if user input is performed on the standby screen during steps S230 and S240 in a state where the value "ON" is assigned to the prohibition flag, the CPU 32 does not make a positive determination (e.g., "YES") in step S140 (i.e., the CPU 32 does not execute processing of steps S150 to S170). In step S245, in response to completion of the connection processing for establishing a connection with the third mobile terminal (e.g., step S240), the CPU 32 changes the value of the allowed to execute connection processing for establishing a Wi-Fi® connection with the first mobile terminal. Subsequent to step S245, the CPU 32 thus monitors user input in step S140. In response to acceptance of user input (e.g., YES in step S140), the CPU 32 executes connection processing for establishing a Wi-Fi® connection with the first mobile terminal (e.g., steps S150 to S170).

As illustrated in FIG. 7, similar to the first standby processing, if the CPU 32 determines that an NFC connection has been established between the MFP 10 and the third mobile terminal (e.g., YES in step S500), in response to receipt of a preferential instruction from the third mobile terminal, the CPU 32 stores the prohibition flag with the value "ON" in the memory 43. Thus, for example, if user input is performed on the standby screen during steps S560 and S600 in a state where the value "ON" is assigned to the prohibition flag, the CPU 32 does not make a positive determination (e.g., "YES") in step S460 (i.e., the CPU 32 does not execute processing of steps S470 to S490). In step S625, in response to completion of the connection processing for establishing a Wi-Fi® connection with the third mobile terminal (e.g., step S600), the CPU 32 changes the value of the prohibition flag from "ON" to "OFF".

Case K: Specific Example Implemented when MFP 10 is in Device Status; FIG. 21

Hereinafter, referring to FIG. 21, an explanation will be provided on a specific example case to be implemented by processing illustrated in FIGS. 3 and 4 when the MFP 10 is in the device status.

The MFP 10 executes processing that are the same or similar to the processing of steps T210 to T224 in FIG. 8. Thus, the MFP 10 displays the standby screen SS2 on the display 14. Processing executed in each of steps T1226 to T1231 is the same or similar to the processing executed in each of steps T426 to T431, respectively, in FIG. 10. In step T1232, in response to receipt of a preferential instruction from the mobile terminal 200 in step T1231, the MFP 10 stores the prohibition flag with the value "ON" (e.g., step S220 in FIG. 4). At that time, the MFP 10 does not end the displaying of the standby screen SS2. Processing executed in each of steps T1234 and T1235 is the same or similar to the processing executed in each of steps T434 and T435, respectively, in FIG. 10. In step T1236, the MFP 10 accepts user input to the OK button on the standby screen SS2. Nevertheless, because the value "ON" is assigned to the prohibition flag, the MFP 10 makes a negative determination (e.g., "NO") in step S140 (refer to FIG. 4). Therefore, the MFP 10 does not shift to the device status (e.g., step T1438 in the comparative example (refer to FIG. 11)) and not transmit a G/O negotiation request (e.g., step S160) to the mobile terminal 100. Thus, the MFP 10 does not execute connection processing for establishing a connection with the mobile terminal 100. Subsequent to step T1236, the MFP 10 executes processing that are the same or similar processing to the processing executed in each of steps T326 to T340 in FIG. 9. In step T1238, the MFP 10 changes the value of the prohibition flag from "ON" to "OFF" (e.g., step S245).

As described above, in case K, in response to establishment of an NFC connection with the mobile terminal 200 while the standby screen SS2 is displayed on the MFP 10, the value "ON" is assigned to the prohibition flag. Therefore, if user input is performed on the OK button of the standby screen SS2, the MFP 10 does not shift to the device status from the G/O status (refer to T1438 in FIG. 11 (e.g., the first comparative example)) and does not transmit a G/O negotiation request to the mobile terminal 100. Thus, the MFP 10 is allowed to establish a Wi-Fi® connection with the mobile terminal 200 successfully.

Figure 22:
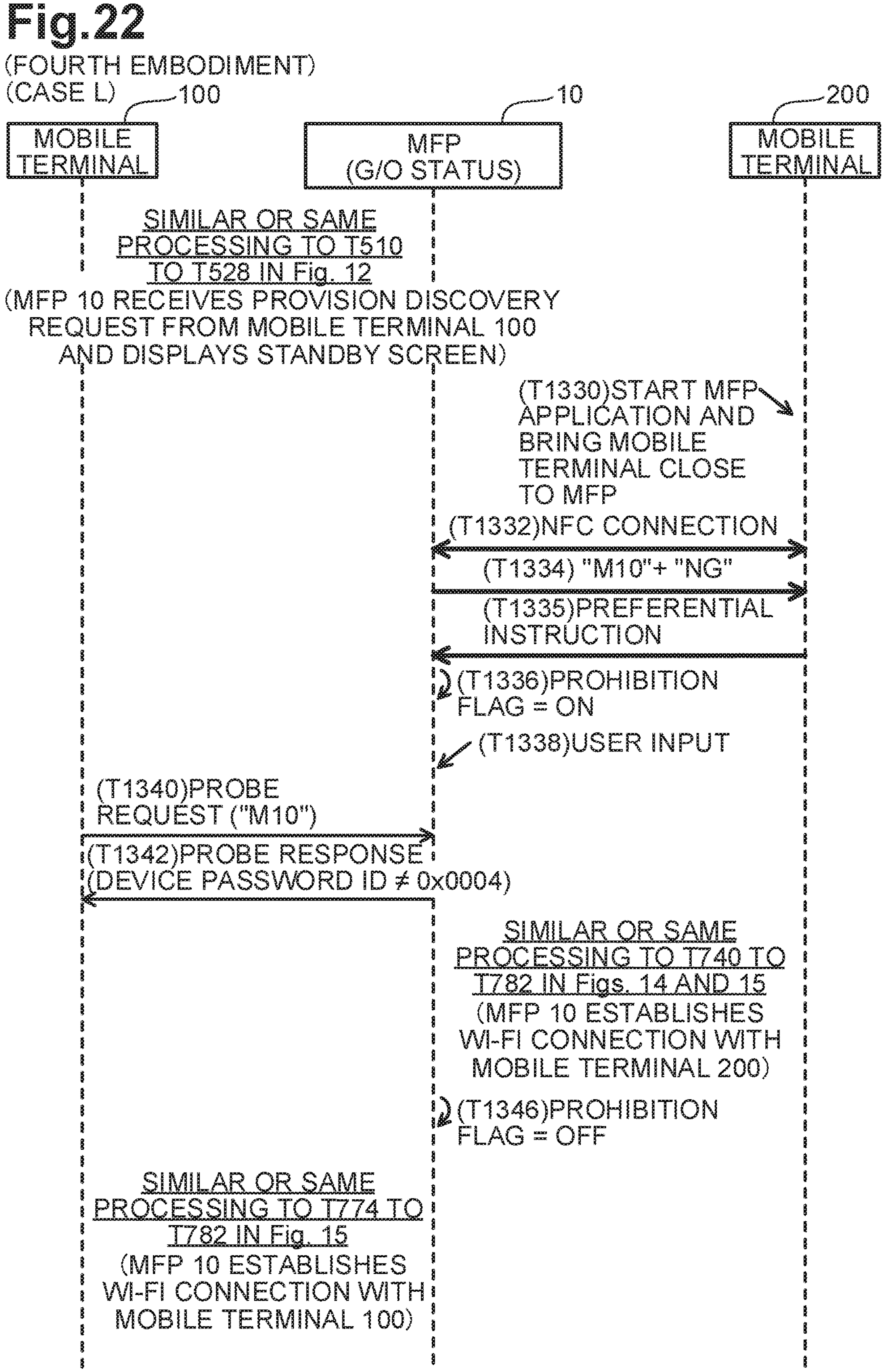
FIG. 22 is a sequence diagram representing interactions between the multifunction peripheral and the mobile terminals in case L in which an NFC connection becomes established when the multifunction peripheral is in the G/O status and the standby screen is being displayed in the fourth embodiment according to one or more aspects of the disclosure.

Case L: Specific Example Implemented when MFP 10 is in G/O Status; FIG. 22

Hereinafter, referring to FIG. 22, an explanation will be provided on a specific example case to be implemented by processing illustrated in FIGS. 6 and 7 when the MFP 10 is in the G/O status.

The MFP 10 executes processing that are the same or similar to the processing of steps T510 to T528 in FIG. 12. Processing executed in each of steps T1330 to T1335 is the same or similar to the processing executed in each of steps T730 to T735, respectively, in FIG. 14. In step T1336, in response to receipt of a preferential instruction from the mobile terminal 200 in step T1335, the MFP 10 stores the prohibition flag with the value "ON". In step T1338, the MFP 10 accepts user input to the OK button on the standby screen SS2. Nevertheless, because the prohibition flag is assigned with "ON", the MFP 10 does makes a negative determination (e.g., "NO") in step S460 (refer to FIG. 7). Therefore, the MFP 10 does not transmit a Probe response including the information "Device Password ID=0x0004" (e.g., step S485) to the mobile terminal 100. Thus, the MFP 10 does not execute connection processing for establishing a connection with the mobile terminal 100. Processing executed in each of steps T1340 and T1342 is the same or similar to the processing executed in each of steps T740 and T742, respectively, in FIG. 15. Subsequent to step T1342, the MFP 10 executes processing that are the same or similar processing to the processing executed in each of steps T738 to T770 in FIGS. 14 and 15. In step T1346, the MFP 10 changes the value of the prohibition flag from "ON" to "OFF" (e.g., step S625). Subsequent to step T1346, the MFP 10 executes processing that are the same or similar processing to the processing executed in each of steps T774 to T782 in FIG. 15.

As described above, in case L, where the prohibition flag is assigned with "ON", if the MFP 10 receives a Probe request from the mobile terminal 100 after accepting user input to the standby screen SS2, the MFP 10 transmits a Probe response not including the information "Device Password ID=0x0004" to the mobile terminal 100 (refer to T1342 in FIG. 22) rather than a Probe response including the information "Device Password ID=0x0004" to the mobile terminal 100 (refer to T1742 in FIG. 16 (e.g., the second comparative example)). This configuration may therefore reduce or prevent execution of the connection processing for establishing a connecting with the mobile terminal 100 concurrently with execution of the connection processing for establishing a connecting with the mobile terminal 200. Thus, the MFP 10 is allowed to establish a Wi-Fi® connection with the mobile terminal 200 successfully.

Each communication executed in step S165 to S170 in FIG. 4 and in step S490 in FIG. 7 is an example of "communication for establishing a connection via the second wireless interface". Each of the G/O negotiation request transmitted in step S160 in FIG. 4 and the Probe response transmitted in step S485 in FIG. 7 is an example of a "signal for starting communication for establishing the connection". The G/O negotiation request transmitted in step S160 is an example of a "determination communication request signal"

and an example of a "first-type predetermined signal". The Probe request received in step S480 is an example of an "identifier request signal". The Probe response transmitted in step S485 is an example of a "second-type predetermined signal". The information "Device Password ID=0x0004" is an example of "information for starting communication for establishing a connection via the second wireless interface".

While the embodiment of the present invention has been described in detail, this is merely an example and does not limit the scope of the appended claims. Technique disclosed in the scope of the claims includes various changes, arrangement and modifications of the embodiment. Hereinafter, example variations of the above-described embodiment will be described.

First Variation

The "standby screen" might not necessarily be configured to wait for input to the OK button (i.e., the "standby screen" might not necessarily be the standby screen for the PBC protocol of the WPS). For example, the "standby screen" may be a standby screen for PIN code system. In one example, where a PIN code displayed on the MFP 10 is entered to an operation interface of a mobile terminal, a screen for displaying the PIN code on the MFP 10 is another example of the "standby screen". In such a case, the user operation (i.e., entry of the PIN code) may be performed on the operation interface of the mobile terminal. That is, where the MFP 10 receives, from the mobile terminal, a specific signal including the entered PIN code displayed on the MFP 10, the MFP 10 executes the processing of steps S150 to S170 in FIG. 4, and/or the processing of steps S440 to S470 in FIG. 7. In such a case, in steps S140, and S460, the CPU 32 determines whether a specific signal has been received. The operation interface 112 of the mobile terminal 100 is another example of the "operation interface". In another example, where a PIN code displayed on the mobile terminal is entered to the MFP 10, an entry screen for the PIN code displayed on the MFP 10 is another example of the "standby screen". In such a case, the user operation (i.e., entry of the PIN code) may be performed on the MFP 10. In still another example, the screen for accepting a user operation in accordance with the WPS might not necessarily be displayed, and another screen for accepting a user operation in accordance with another system (e.g., AirStation One-Touch Secure System ("AOSSTM") (AOSSTM is a trademark owned by Buffalo Inc. of Nagoya, Japan) may be displayed.

Second Variation

In the first to fourth embodiments, where an NFC connection becomes established between the MFP 10 and the third mobile terminal while the standby screen is displayed on the MFP 10 (e.g., YES in step S180 in FIG. 4, or YES in step S500 in FIG. 7), the CPU 32 might not necessarily determine whether the third mobile terminal has transmitted a preferential instruction to the MFP 10. That is, the processing executed in step S190 in FIG. 4 may be omitted. In other words, a "determining unit" may be omitted. In such a case, the third mobile terminal might not necessarily transmit a preferential instruction to the MFP 10.

Third Variation

In the first to third embodiments, where the MFP 10 establishes a Wi-Fi® connection with the third mobile terminal with being triggered by establishment of an NFC connection therebetween after ending the displaying of the standby screen (e.g., step S600), the MFP 10 might not necessarily display the standby screen again. That is, the processing executed in step S620 in FIG. 7 may be omitted. In other words, a "third display controller" may be omitted.

Fourth Variation

The CPU 32 may be configured to execute only one of the processing executed by the MFP 10 having the device status and the processing executed by the MFP 10 having the G/O status. That is, the CPU 32 may be configured to execute only one of the processing in FIG. 3 (and FIG. 4) and the processing in FIG. 6 (and FIG. 7). Where the CPU 32 is configured to execute the processing in FIG. 3 (and FIG. 4) only, the "transmitting unit" and a "storage controller" may be omitted.

Fifth Variation

According to the embodiments, when the MFP 10 shifts to the G/O status (e.g., step S120) after establishing an NFC connection with the second mobile terminal (e.g., YES in step S80 in FIG. 3) or when the MFP 10 shifts to the G/O status (e.g., step S230 after establishing an NFC connection with the third mobile terminal (e.g., YES in step S180 in FIG. 4), the MFP 10 generates an SSID. Nevertheless, the MFP 10 may generate an SSID to be used in a WFDNW in which the MFP 10 operates as a G/O, prior to such timings. In such a case, in step S80 in FIG. 3 and step S180 in FIG. 4, the NFC I/F 22 may transmit the pregenerated SSID through the established NFC connection instead of the MAC address. That is, the processing of step T325 in FIG. 9 might not necessarily be executed, and in step T322, the MFP 10 may transmit the SSID "X10" instead of the MAC address "M10". In such a case, in step T430 in FIG. 10, step T831 in FIG. 17, steps T1030 and T1036 in FIG. 19, and step T1230 in FIG. 21, the MFP 10 may transmit the SSID "X10" instead of the MAC address "M10". In step S380 in FIG. 6 and step S500 in FIG. 7, the NFC I/F 22 may transmit the pregenerated SSID through the established NFC connection instead of the MAC address. That is, in step T622 in FIG. 13, the MFP 10 may transmit the SSID "X10" to the mobile terminal 200 instead of the MAC address"M10". In such a case, in step T734 in FIG. 14, step T937 in FIG. 18, steps T1134 and T1147 in FIG. 20, and step S1334 in FIG. 22, the MFP 10 may transmit the SSID "X10" instead of the MAC address "M10".

Sixth Variation

The "first wireless interface" might not necessarily be the NFC I/F, and may be an interface for enabling other communication such as Bluetooth® (Bluetooth® is a registered trademark owned by BLUETOOTH SIG. INC. of Kirkland, Wash.) communication, infrared communication, or TransferJet™ (TransferJet™ is a trademark owned by Sony Corporation of Tokyo, Japan) communication.

Seventh Variation

The "wireless connection via the second wireless interface" might not necessarily be a wireless connection that complies with the WFD protocol. For example, the "wireless connection via the second wireless interface" may be a wireless connection that compiles with a software enabled access point ("SoftAP") protocol.

Eighth Variation

The "communication device" might not necessarily be capable of performing multiple functions. For example, the "communication device " may be a single function device such as a printer capable of performing a printing function only or a scanner capable of performing a scanning function only, a general-purpose computer, or a mobile terminal.

The technical elements described in the specification and the drawings exhibit technical usability alone or in various combination, and not limited to those in the claims at the time of the application of the disclosure. Furthermore, the techniques described as examples in the specification or drawings may achieve a plurality of objects simultaneously, and has technical utility by achieving any one of these objects.

What is claimed is:

1. A communication device comprising:
a first wireless interface configured to communicate over a first distance;
a second wireless interface configured to communicate over a second distance, the second distance being greater than the first distance;
a display;
a processor; and
a memory storing computer-readable instructions therein, the computer-readable instructions, when executed by the processor, causing the communication device to:
receive, via the second wireless interface, a connection request from a first external device;
wait, after receiving the connection request from the first external device, for user confirmation of second wireless interface connection between the first external device and communication device;
establish, via the first wireless interface, while waiting, a connection with a second external device; and
based on no user confirmation having been received, despite receiving the connection request from the first external device, and based on the connection with the second external device having been established:
terminate the waiting for user confirmation of the second wireless interface connection between the first external device and the communication device; and
establish, via the second wireless interface, a connection with the second external device.

2. The communication device as in claim 1, wherein the computer-readable instructions, when executed by the processor, further cause the communication device to:
determine whether a predetermined instruction is received from the second external device by using the connection via the first wireless interface, the predetermined instruction being sent from the second external device to the communication device where the second external device comprises an application for establishing, via the second wireless interface, the connection with the second external device, the predetermined instruction not being sent from the second external device to the communication device where the second external device does not comprise the application, and
wherein, where determined that the predetermined instruction is received from the second external device by using the connection with the second external device via the first wireless interface,
the termination of the waiting is executed; and
the establishing, via the second wireless interface, the connection with the second external device comprising the application is executed; and
wherein, where determined that the predetermined instruction is not received from the second external device by using the connection with the second external device via the first wireless interface,
the termination of the waiting is not executed; and
the establishing, via the second wireless interface, the connection with the second external device not comprising the application is not executed.

3. The communication device as in claim 2,
wherein the predetermined instruction is not sent from the second external device comprising the application to the communication device where a first establishing the wireless connection via the first wireless interface before the user confirmation, and
wherein the predetermined instruction is sent from the second external device comprising the application to the communication device where a second establishing the wireless connection via the first wireless interface before the user confirmation.

4. The communication device as in claim 1,
wherein the communication device is capable of selectively operating in one of a plurality of states including a parent station state in which the communication device functions as a parent station of a wireless network, a child station state in which the communication device functions as a child station of the wireless network and a specific state different from the parent station state and the child station state,
wherein the establishing the connection with the second external device via the second wireless interface is executed after shifting the state of the communication device from the specific state to the parent state where the state of the communication device is the specific state.

5. The communication device as in claim 4,
wherein, where a request signal is received from the first external device where the state of the communication device is the parent station state in which the communication device functions as a parent station of the wireless network, the establishing, via the second wireless interface, the connection with the second external device is executed without sending a response signal including information for starting the communication for establishing the second wireless interface connection with the first external device.

6. The communication device as in claim 5, wherein the computer-readable instructions, when executed by the processor, further cause the communication device to:
re-wait for the user confirmation without re-receiving the connection request from the first external device after establishing, via the second wireless interface, the connection with the second external device.

7. The communication device as in claim 1,
wherein the computer-readable instructions, when executed by the processor, further cause the communication device to:
where no user confirmation has been received and the connection with the second external device has been established and a state of the communication device is a parent station state in which the communication device functions as a parent station of a wireless network, store a MAC address of the first external device in a predetermined list in the memory,
where request signal is received from the first external device where the state of the communication device is the parent station state, a response signal including information for starting the communication for establishing the connection with the second external device, send a response to the second external device in response to determining a MAC address included in a request signal is not equal to the MAC address of the first external device storing in the predetermined list, and
wherein, after the response signal being sent to the second external device, the establishing the connection with the second external device is executed by executing the communication for establishing the connection via the second wireless interface with the second external device.

8. The communication device as in claim 1, wherein the user confirmation is operation equivalent to push-button operation of WPS (Wi-Fi Protected Setup).

9. The communication device as in claim 1, wherein the computer-readable instructions, when executed by the processor, further cause the communication device to:

while waiting, output a screen to the display for waiting for user confirmation of second wireless interface connection between the first external device and communication device.

10. The communication device as in claim 9, wherein the screen includes only one option that, upon selection, authorizes the second wireless interface connection.

11. The communication device as in claim 9, wherein the screen includes first option that, upon selection, authorizes the second wireless interface connection and second option that deny the second wireless interface connection.

12. The communication device as in claim 1, wherein the user confirmation is communication from first external device that user has interacted with first external device.

13. A communication device comprising:

a first wireless interface configured to communicate over a first distance;

a second wireless interface configured to communicate over a second distance, the second distance being greater than the first distance;

a processor; and a memory storing computer-readable instructions therein, the computer-readable instructions, when executed by the processor, causing the communication device to:

receive, via the second wireless interface, a connection request from a first external device;

wait, after receiving the connection request from the first external device, for a user confirmation of second wireless interface connection between the first external device and communication device;

establish, via first wireless interface, while waiting, a connection with a second external device; and execute an establishing process, while waiting, wherein the establishing process is a process for establishing, via the second wireless interface, a connection with the second external device, and wherein, while the establishing process is executing, the communication device does not respond to subsequent receipt of the user confirmation for establishing despite receiving the connection request from the first external device.

14. The communication device as in claim 13, wherein the computer-readable instructions, when executed by the processor, further cause the communication device to:

determine whether predetermined instruction is received from the second external device by using the connection via the first wireless interface, the predetermined instruction being sent from the second external device to the communication device where the second external device comprises application for establishing, via the second wireless interface, the second wireless connection, the predetermined instruction not being sent from the second external device to the communication device where the second external device does not comprise the application, and wherein, where determined that the predetermined instruction is received from the second external device using the connection via the first wireless interface, the establishing, via the second wireless interface, the connection with the second external device comprising the application is executed, and wherein, where determined that the predetermined instruction is not received from the second external device using the wireless connection via the first wireless interface, the establishing, via the second wireless interface, the connection with the second external device comprising the application is not executed.

15. The communication device as in claim 13, wherein the communication device is capable of selectively operating in one of a plurality of states including a parent station state in which the communication device functions as a parent station of a wireless network, a child station state in which the communication device functions as a child station of the wireless network and a specific state different from the parent station state and the child station state, wherein a first kind of the connection request is received from the first external device, via the second wireless interface where the state of the communication device is in the specific state, where the establishing, via the first wireless interface, the connection with the second external device is not executed, a first kind of predetermined signal is sent via the second wireless interface to the first external device where the state of the communication device is the specific state, the first kind of the predetermined signal being signal for requesting determination communication for determining in which the parent station or the child station the communication device is to operate.

16. The communication device as in claim 13, wherein a second kind of the connection request is received from the first external device via the second wireless interface is executed where a state of the communication device is a parent station state in which the communication device functions as a parent station of a wireless network, and where the establishing, via the first wireless interface, the connection with the second external device is not executed, a second kind of predetermined signal is sent to the first external device via the second wireless interface in response to receiving signal for requesting identifier for identifying the wireless network from the first external device via the second wireless interface where the state of the communication device is the parent station state, the second kind of the predetermined signal including the identifier and information for starting the communication for the wireless connection via the second wireless interface.

17. The communication device as in claim 13, wherein the user confirmation is communication from first external device that user has interacted with first external device.

18. The communication device as in claim 13, further comprising:

a display, wherein the computer-readable instructions, when executed by the processor, further cause the communication device to:

while waiting, output a screen to the display for waiting for user confirmation of second wireless interface connection between the first external device and communication device.

19. The communication device as in claim 18, wherein the screen includes only one option that, upon selection, authorizes the second wireless interface connection.

20. The communication device as in claim 18, wherein the screen includes a first option that, upon selection, authorizes the second wireless interface connection and second option that deny the second wireless interface connection.

21. The communication device as in claim 13, wherein the user confirmation is operation equivalent to push-button operation of WPS (Wi-Fi Protected Setup).

22. A non-transitory computer-readable recording medium storing computer-readable instructions for a communication device, wherein the computer-readable instructions, when executed by a processor of the communication device, causing the communication device to:

receive, via a second wireless interface, a connection request from a first external device, a first wireless interface being configured to communicate over a first distance, the second wireless interface being configured to communicate over a second distance, the second distance being greater than the first distance;

wait, after receiving the connection request from the first external device, for user confirmation of second wireless interface connection between the first external device and communication device;

establish, via the first wireless interface, while waiting, a connection with a second external device;

terminate the waiting for user confirmation of the second wireless interface connection between the first external device and the communication device based on no user confirmation having been received, despite receiving the connection request from the first external device, and based on the connection with the second external device having been established; and establish connection with the second external device via the second wireless interface.

23. A non-transitory computer-readable recording medium storing computer-readable instructions for a communication device, wherein the computer-readable instructions, when executed by a processor of the communication device, causing the communication device to:

receive, via a second wireless interface, a connection request from a first external device, a first wireless interface being configured to communicate over a first distance, the second wireless interface being configured to communicate over a second distance, the second distance being greater than the first distance;

receive, via the second wireless interface, a connection request from the first external device;

wait, after receiving the connection request from the first external device, for a user confirmation of second wireless interface connection between the first external device and communication device;

establish, via first wireless interface, while waiting, a connection with a second external device; and execute an establishing process, while waiting, wherein the establishing process is a process for establishing, via the second wireless interface, a connection with the second external device, wherein, while the establishing process is executing, the communication device does not respond to subsequent receipt of the user confirmation for establishing despite receiving the connection request from the first external device.

* * * * *